US007835936B2

(12) United States Patent
Ouimet et al.

(10) Patent No.: US 7,835,936 B2
(45) Date of Patent: Nov. 16, 2010

(54) SYSTEM AND METHOD FOR MODELING CUSTOMER RESPONSE USING DATA OBSERVABLE FROM CUSTOMER BUYING DECISIONS

(75) Inventors: Kenneth J. Ouimet, Scottsdale, AZ (US); Robert D. Pierce, Scottsdale, AZ (US)

(73) Assignee: SAP AG, Walldorff (DE)

( * ) Notice: Subject to any disclaimer, the term of this patent is extended or adjusted under 35 U.S.C. 154(b) by 1448 days.

(21) Appl. No.: 10/862,106

(22) Filed: Jun. 5, 2004

(65) Prior Publication Data

US 2005/0273377 A1 Dec. 8, 2005

(51) Int. Cl.
*G06F 17/30* (2006.01)
*G07G 1/00* (2006.01)
(52) U.S. Cl. ............................................. 705/10; 705/7
(58) Field of Classification Search .................... 705/10
See application file for complete search history.

(56) References Cited

U.S. PATENT DOCUMENTS

| 6,708,156 | B1 * | 3/2004 | Gonten .......................... 705/10 |
| 6,842,719 | B1 * | 1/2005 | Fitzpatrick et al. ........... 702/182 |
| 7,165,037 | B2 * | 1/2007 | Lazarus et al. ................. 705/10 |
| 2001/0049690 | A1 * | 12/2001 | McConnell et al. ....... 707/104.1 |
| 2002/0065699 | A1 * | 5/2002 | Talluri ............................ 705/8 |
| 2003/0065555 | A1 * | 4/2003 | von Gonten et al. .......... 705/10 |
| 2004/0015386 | A1 * | 1/2004 | Abe et al. ...................... 705/10 |
| 2004/0190448 | A1 * | 9/2004 | Fishteyn et al. .............. 370/229 |
| 2005/0071223 | A1 * | 3/2005 | Jain et al. ...................... 705/14 |
| 2005/0165596 | A1 * | 7/2005 | Adar et al. ..................... 703/22 |
| 2007/0239519 | A1 * | 10/2007 | Walker et al. ................. 705/10 |

OTHER PUBLICATIONS

SAP Promotion Optimization, http://www.sap.com/industries/retail/pdf/BWP_SB_Promotion_Optimization_Mak.pdf, copyright Jun. 2003.*
KhiMetrics Launches New Promotion Optimization Capability to Help Retailers Navigate the $90 Billion Promotions Market. (Nov. 21, 2002). PR Newswire, 1. (Document ID: 242120751).*

* cited by examiner

*Primary Examiner*—Andre Boyce
(74) *Attorney, Agent, or Firm*—Robert D. Atkins

(57) ABSTRACT

A computer system models customer response using observable data. The observable data includes transaction, product, price, and promotion. The computer system receives data observable from customer responses. A set of factors including customer traffic within a store, selecting a product, and quantity of selected product is defined as expected values, each in terms of a set of parameters related to customer buying decision. A likelihood function is defined for each of the set of factors. The parameters are solved using the observable data and associated likelihood function. The customer response model is time series of unit sales defined by a product combination of the expected value of customer traffic and the expected value of selecting a product and the expected value of quantity of selected product. A linear relationship is given between different products which includes a constant of proportionality that determines affinity and cannibalization relationships between the products.

14 Claims, 7 Drawing Sheets

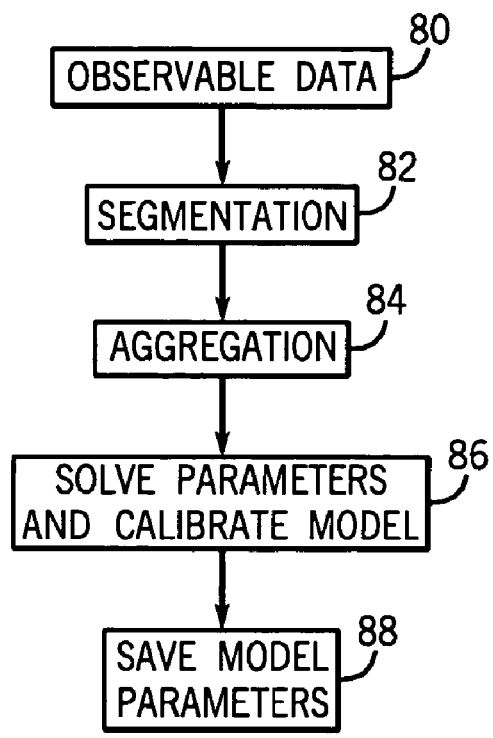
FIG. 6
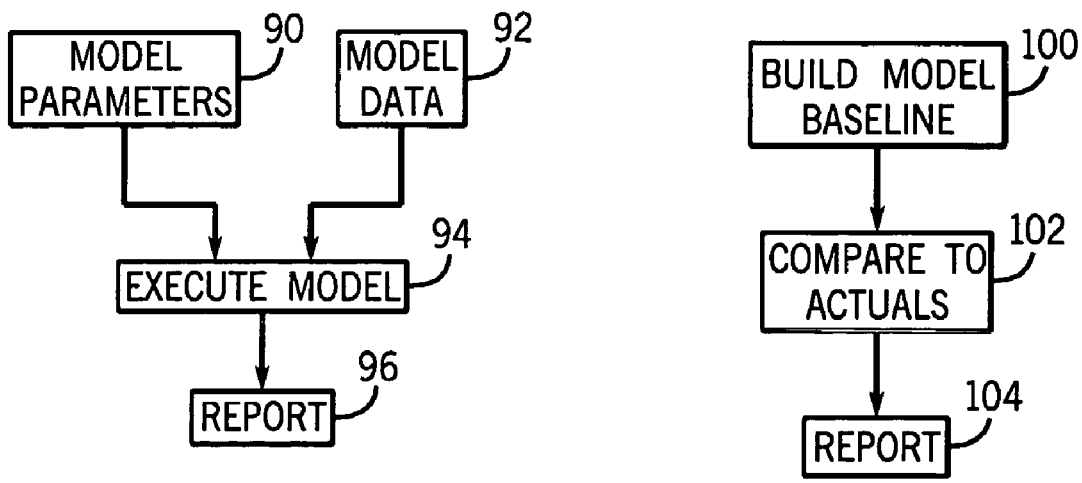
FIG. 7
FIG. 8

SYSTEM AND METHOD FOR MODELING CUSTOMER RESPONSE USING DATA OBSERVABLE FROM CUSTOMER BUYING DECISIONS

CROSS REFERENCE TO RELATED PATENT APPLICATIONS

The present patent application is related to copending U.S. patent application Ser. No. 10/862,104, now U.S. Pat. No. 7,680,685, entitled "System and Method for Modeling Affinity and Cannibalization in Customer Buying Decisions" and filed concurrently herewith by Kenneth J. Ouimet et al.

FIELD OF THE INVENTION

The present invention relates in general to economic modeling and, more particularly, to a system and method for modeling customer response using data observable from customer purchase decisions.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy, in the past tense, to review historical data, understand its past performance, and state with relative certainty that the system's past behavior was indeed driven by the historical data. A much more difficult task, but one that is extremely valuable, is to generate a mathematical model of the system which predicts how the system will behave, or would have behaved, with different sets of data and assumptions. While forecasting and backcasting using different sets of input data is inherently imprecise, i.e., no model can achieve 100% certainty, the field of probability and statistics has provided many tools which allow such predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data, both in terms of forecasting and backcasting. In other words, the model should be able to predict the outcome or response of the system to a specific set of data being considered or proposed, within a level of confidence, or an acceptable level of uncertainty. As a simple test of the quality of the model, if historical data is processed through the model and the outcome of the model, using the historical data, is closely aligned with the known historical outcome, then the model is considered to have a high confidence level over the interval. The model should then do a good job of predicting outcomes of the system to different sets of input data.

Economic modeling has many uses and applications. One emerging area in which modeling has exceptional promise is in the retail sales environment. Grocery stores, general merchandise stores, specialty shops, and other retail outlets face stiff competition for limited customers and business. Most if not all retail stores make every effort to maximize sales, volume, revenue, and profit. Economic modeling can be a very effective tool in helping the store owners and managers achieve these goals.

Retail stores engage in many different strategies to increase sales, volume, revenue, and profit. One common approach is to offer promotions on select merchandise. The store may offer one or more of its products at temporary sale price, discounts for multiple item purchases, or reduced service charges. One or more items may be offered with a percentage off regular price, fixed reduced price, no interest financing, no sales tax, or the well-known "buy two get one free" sale. The store may run advertisements, distribute flyers, and place promotional items on highly visible displays and end-caps (end displays located on each isle). In general, promotional items are classified by product, time of promotion, store, price reduction, and type of promotion or offer.

The process by which retailers select and implement promotional programs varies by season, region, company philosophy, and prior experience. Some retailers follow the seasonal trends and place on promotion those items which are popular or in demand during the season. Summertime is for outdoor activities; Thanksgiving and Christmas are for festive meals, home decorations, and gift giving; back-to-school is new clothes and classroom supplies. Some retailers use flyers and advertisements in newspapers, television, radio, and other mass communication media for select merchandise on promotion, without necessarily putting every item at a reduced price. Some retailers try to call attention to certain products with highly visible displays. Other retailers follow the competition and try to out-do the other. Still other retailers utilize loss-leaders and sell common items at cost or below cost in an effort to get customers into the store to hopefully buy other merchandise. The retailers may also focus on which other items will sell with the promotional items.

Promotional programs are costly and time consuming. Flyers and advertisements are expensive to run, base margins are lost on price reductions, precious floor-space and shelf-space are dedicated to specific items, and significant time and energy are spent setting up and administering the various promotions implemented by the retailer. It is important for the retailer to get good results, i.e. net profit gains, from the promotional investments. Yet, most if not all retailers make promotional decisions based on canned programs, gross historical perception, intuition, decision by committee, and other non-scientific indicators. Many promotional plans are fundamentally based on the notion that if we did it in the past it must be good enough to do again. In most situations, retailers simply do not understand, or have no objective scientific data to justify, what promotional tools are truly providing the best results on a time dependent per product basis.

Customers make their own buying decisions and do not necessarily follow trends. Retailers may have false understanding as to what factors have been primarily driving previous buying decisions and promotional successes. What has been perceived as working in the past may not achieve the same results today, possibly because the basis for belief in the effectiveness of prior promotion programs is flawed. Other unknown or non-obvious factors may be in play driving customer buying decisions which undermine or reveal the weakness in previous promotions. Economic, demographic, social, political, or other unforeseen factors may have changed and thereby altered the basis for customer buying decisions. In spite of costly and elaborate promotions, retailers not infrequently end up with disappointing sales, lower than expected profits, unsold inventory, and lost opportunities based on promotional guesswork. When a promotional program fails to achieve intended objectives, retailers, distributors, manufacturers, and promotional support organizations all lose confidence and business opportunity.

A need exists for an economic model which helps retailers make effective and successful promotional decisions in view of customer responses.

SUMMARY OF THE INVENTION

In one embodiment, the present invention is a computer implemented method of modeling customer response comprising providing data observable from customer responses, providing an expected value of customer traffic within a store in terms of a first set of parameters, providing an expected value of selecting a product in terms of a second set of parameters, providing an expected value of quantity of selected product in terms of a third set of parameters, solving for the first, second, and third sets of parameters using the data observable from customer responses, and providing a customer response model as a combination of the expected value of customer traffic and the expected value of selecting a product and the expected value of quantity of selected product.

In another embodiment, the present invention is a method of modeling customer response based on customer buying decision comprising providing expected values for a set of factors representing components of the customer buying decision, wherein each of the set of factors uses a set of parameters related to the customer buying decision, solving for the set of parameters for each of the set of factors using data observable from customer response, and providing a customer response model from the expected values of each of the set of factors with the solved set of parameters.

In yet another embodiment, the present invention is a method of modeling purchasing decision processes comprising providing a set of factors which define a purchasing decision process, expressing each of the set of factors in terms of a statistical relationship involving a set of parameters related to the purchasing decision process, solving for the set of parameters using data observable from the decision process, and providing a model from the set of factors with the solved set of parameters.

In yet another embodiment, the present invention is a method of providing a computer model of customer response comprising providing a set of factors related to customer buying decision, wherein each of the set of factors uses a set of parameters related to the customer buying decision, solving for the set of parameters using data observable from the customer buying process, and providing a computer model of the customer response from the set of factors with the solved set of parameters.

BRIEF DESCRIPTION OF THE DRAWINGS

FIG. 6 is a block diagram of creating the promotional model;

FIG. 7 is a block diagram of executing the promotional model;

FIG. 8 is a block diagram of an evaluation of a model baseline;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool which allows companies to conduct business planning, forecast demand, model revenue, and optimize price and profit. Economic modeling is applicable to many businesses such as manufacturing, distribution, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses which face thin profit margins, such as general customer merchandise and other retail outlets. Clearly, many businesses are keenly interested in economic modeling and forecasting, particularly when the model provides a high degree of accuracy or confidence. Such information is a powerful tool and highly valuable to the business.

The present discussion will consider economic modeling as applied to retail merchandising. In particular, understanding the cause and effect behind promotional offerings is important to increasing the profitability of the retail stores. The present invention addresses effective modeling techniques for various promotions, in terms of forecasting and backcasting, and provides tools for a successful, scientific approach to promotional programs with a high degree of confidence.

Figure 1:
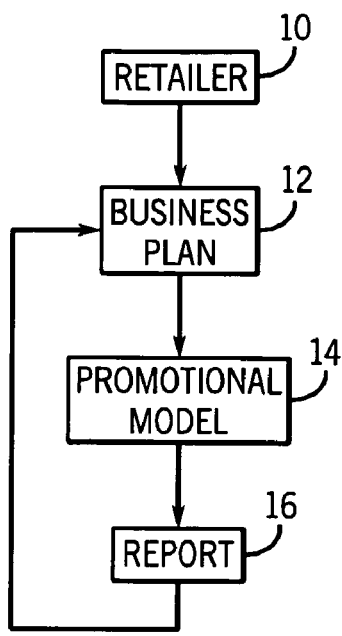
FIG. 1 is a block diagram of retail business process using a promotional model.

In FIG. 1, retail outlet (retailer) 10 has certain product lines or services available to customers as part of its business plan. The terms products and services are interchangeable in the present application. Retailer 10 may be a food store chain, general customer product retailer, drug store, discount warehouse, department store, specialty store, service provider, etc. Retailer 10 has the ability to set pricing, order inventory, run promotions, arrange its product displays, collect and maintain historical sales data, and adjust its strategic business plan. The management team of retailer 10 is held accountable for market share, profits, and overall success and growth of the business. While the present discussion will center around retailer 10, it is understood that the promotional modeling tools described herein are applicable to other industries and businesses having similar goals, constraints, and needs. The model works for any product/service which may be promoted by the business. Moreover, the model can be used for many other decision processes in businesses other than retail such as described above.

Retailer 10 has business or operational plan 12. Business plan 12 includes many planning, analyzing, and decision-making steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make operational decisions. Retailer 10 can change business plan 12 as needed. In order to execute on business plan 12, the management team needs accurate economic models. In one application of the subject decision model, the methodology of the model is applied to promotional programs to help retailer 10 make important operational decisions to increase the effectiveness of such programs.

From business plan 12, retailer 10 provides certain observable data and assumptions, and receives back specific forecasts and predictions from promotional model 14. The model performs a series of complex calculations and mathematical operations to predict and forecast the business functions in which retailer 10 is most interested. The output of promotional model 14 is a report, chart, table, or other analysis 16, which represents the model's forecasts and predictions based on the model parameters and the given set of data and assumptions. Report 16 is made available to business plan 12 so that retailer 10 can make promotional and operational decisions.

From time to time, retailer 10 may offer one or more of its products/services on promotion. In general, a promotion relates to any effort or enticement made by retailer 10 to call attention to its product lines, increase the attractiveness of the product, or otherwise get the attention of its customer base, which may lead to, or increase the likelihood of, the customer making the purchasing decision. For example, the product may be given temporary sale price, discount for multiple item purchases, and reduced service charges. One or more items may be offered with a percentage off regular price, fixed reduced price, coupon, rebate, no interest financing, no sales tax, preferred customer discounts, or "buy two get one free" sale. Retailer 10 may run advertisements and flyers in mass communication media such as newspapers, television, and radio. Retailer 10 may place promotional items on highly visible displays and end-caps. Retailer 10 may sponsor public events, bring in celebrities, solicit testimonials, create slogans, utilize props, and piggy-back community efforts and current events. Promotional campaigns use any and all tasteful and appropriate means of calling attention to retailer 10 and its products/services. In general, promotional programs are classified by product/service, time of promotion, store, price reduction, and type of promotion or offer. A store may be a single location, or a chain or logical group of stores.

The promotional programs can greatly influence the customer buying decision, in terms of selecting the store, selecting the product to buy, and choosing the number of items of selected products to purchase. Promotional programs are designed to draw customers into the store to purchase the promoted product. Retailer 10 will hope that customer 24 also decides to buy additional merchandise, including items which are regular price. Moreover, the customer may be motivated to purchase more quantity of a given product by the promotion than they would have normally wanted. If the promotion is "buy two get one free", then whereas the customer may have purchased only one without promotion, the logical choice becomes to buy at least two since, if they do, the third one is free. A similar motivation exists with multiple item discounts, such as three for a dollar or 10% discount for buying 10 or more. The natural customer response and behavior is to seek the best overall value. Customer 24 will likely place more than one item in his or her basket if the offer is formatted in terms of a multiple item deal. The psychology behind creating properly formatted promotional programs is to influence the customer buying decision and increase the probability of not only selecting retailer 10's store and deciding to buy the promoted product, as well as other products, but also to increase the quantity of products purchased. Customer response model 14 provides the forecasts and predictions which achieve precisely this desired result for retailer 10. Customer 24 gets a good deal and retailer 10 receives greater revenue, profits, and goodwill from the customer.

For those items offered with promotion, report 16 gives retailer 10 the forecast information necessary to compare and contrast different promotional programs and combinations of promotional programs over time. Retailer 10 can use the forecasting features of promotional model 14 to select promotional programs and products, set pricing, forecast demand, order inventory to meet such anticipated demand, and adjust its strategic planning and thinking process, all with the purpose and intent of maximizing market share, revenue, and profits. While the business strategy is formulated at enterprise level, the execution of that strategy usually occurs at the product or store level. Accordingly, promotional model 14 is one tool used by the management team of retailer 10 to execute their strategy for the business.

Promotional model 14 is applied to the common problem of understanding the mental and physical process that customers practice in making the all-important buying decision. More specifically, model 14 helps retailer 10 predict and forecast the effect of different promotional efforts and programs on customer demand and the resulting levels of retail sales, revenue, volume, and profitability. Promotional model 14 can also be used to backcast promotional programs, i.e. consider "what-if" scenarios of prior efforts with different driving factors.

Figure 2:
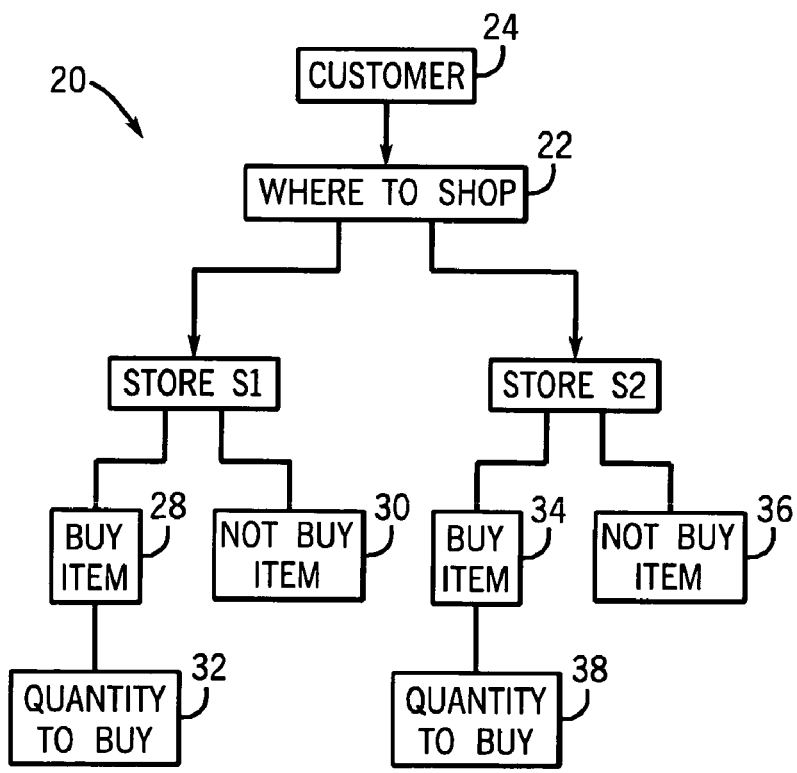
FIG. 2 is a customer buying decision tree.

In one embodiment, the customer buying decision or demand is based on three factors or components: selection of store, selection of product, selection of quantity of product, which are illustrated in purchase decision tree 20 of FIG. 2. In block 22, customer 24 decides where to shop, e.g. in store S1 or store S2. The decision to shop in store S1 or S2 depends in part on store history, growth, seasonality, visual appeal, image, current promotions, price, product selection, product availability, prior experience, habit, quality, brand name, convenience, store layout, location, and customer preference built up over a long period of time. Once in store S1, customer 24 decides in block 28 whether to buy an item, or not buy an item in block 30. The decision to buy product P1 depends in part on price, promotion, seasonality, brand name, merchandising, shelf location, and the like. Other factors which influence the decision to buy also include affinity, i.e. buying one item induces customer 24 to buy another related item, and cannibalization, i.e. decision to purchase one item disinclines customer 24 to purchase another item. If customer 24 decides to buy a cordless screwdriver, he or she may also buy screws or an extra battery. The purchase of the cordless screwdriver may cause the customer to forego purchase of a hand-operated screwdriver.

Once customer 24 decides to buy at least one product P1, then the customer makes a decision about how many items of product P1 to purchase, as shown in block 32. Accordingly, customer 24 places the quantity of product P1 in the shopping cart which he or she decides to purchase.

The process repeats for other products P2 and P3 in store S1. Assuming customer 24 is still in store S1, the customer makes a decision whether to buy product P2 and, if in the affirmative, then he or she decides how much product P2 to buy; and likewise for product P3.

When customer 24 finishes shopping in store S1, the customer may patronize store S2. The process described for purchase decision tree 20 in store S1 also applies to customer buying decisions in store S2. In block 34, customer 24 decides whether to buy an item, or not buy an item in block 36. Once customer 24 decides to buy at least one product P4, then the customer makes a decision about how many items of product P4 to purchase, as shown in block 38. Accordingly, customer 24 places the selected quantity of product P4 in the shopping cart.

Figure 3A:
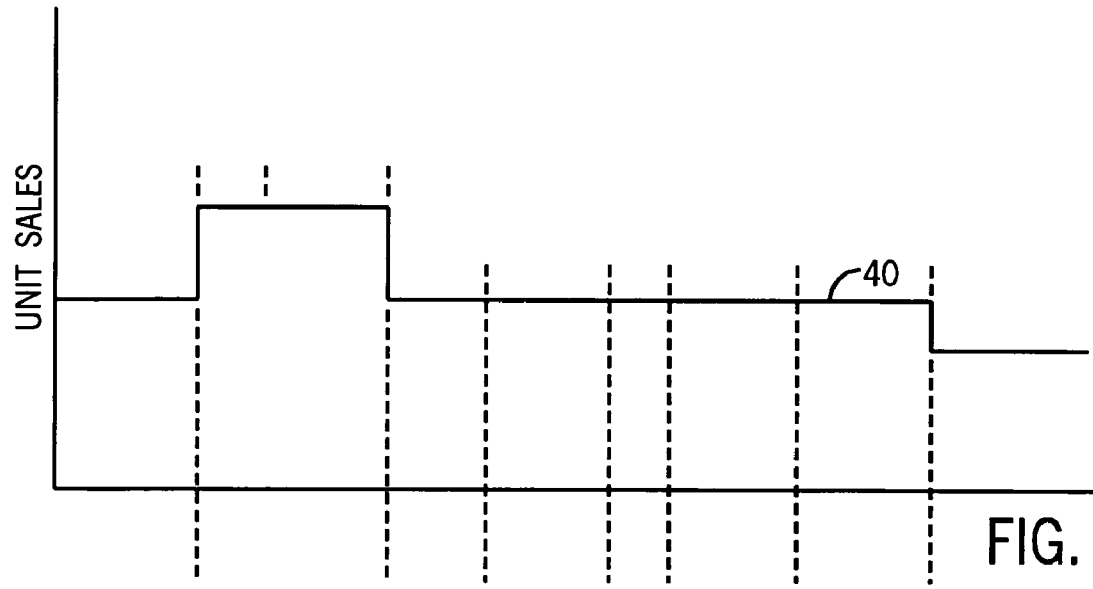
FIGS. 3a-3b are plots of unit sales of a specific item over time.

When viewing customer buying decisions on a per product basis over time, the distribution of unit sales may look like the graph shown in FIG. 3a. Plot 40 illustrates a simplified baseline model for product $P_i$ for volume of sales over time. The baseline model represents unit sales of product $P_i$ with its regular price, without any promotional offer, i.e. no sale price, discounts, incentives, flyer, advertisement, or other customer enticements. Between times $t_1$ and $t_3$, the baseline model of product $P_i$ shows unit sales at an elevated level because of seasonality, i.e. demand rises during certain time(s) of the year. Unit sales returns to normal level at time $t_3$. After time $t_8$, the baseline model shows unit sales of product $P_i$ have fallen because of permanent increase in regular price.

Figure 3B:
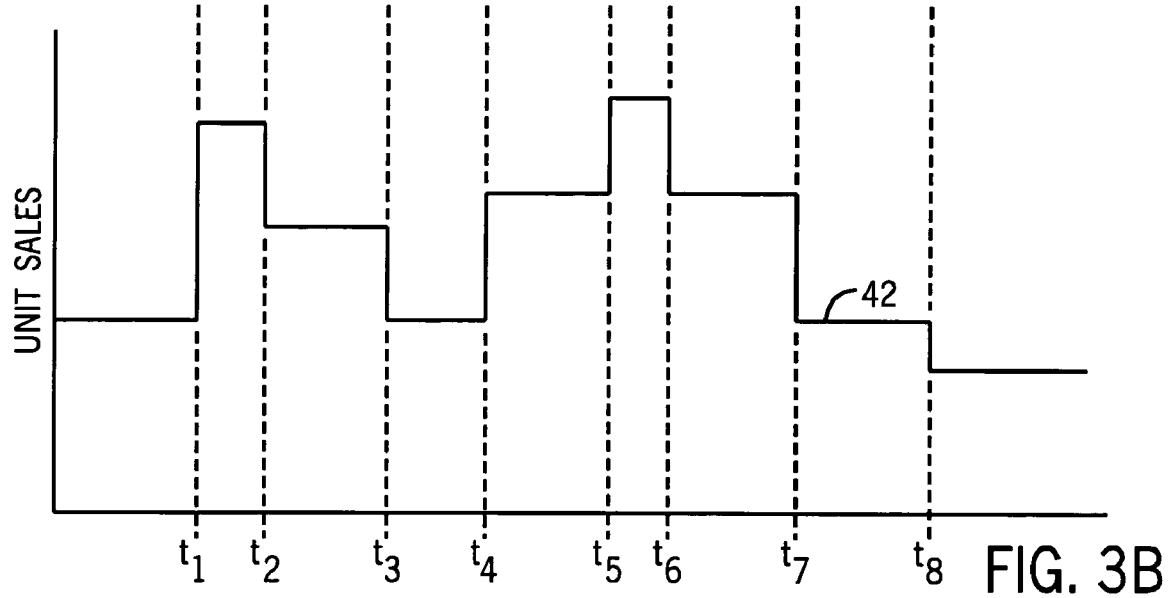

Plot 42 in FIG. 3b illustrates a simplified promotional model of product $P_i$ for unit sales over time. Between times $t_1$ and $t_2$, the promotional model of product $P_i$ shows unit sales increase, over and above the increase associated with seasonality, because of promotional flyers or advertisement distributed at the beginning of the season. Between times $t_2$ and $t_3$, unit sales returns to the level associated with the seasonal lift. Between times $t_3$ and $t_4$, unit sales returns to the baseline rate. The promotional model also shows unit sales of product $P_i$ increase at time $t_4$ because product $P_i$ is placed on end-cap. At time $t_5$, the product $P_i$ is given temporary sale price, causing unit sales to increase even further. The sale price terminates at time $t_6$ and the end-cap display is taken down at time $t_7$, each causing a corresponding decrease in unit sales.

The purpose of promotional model 14 is to predict or forecast (or backcast), with reasonable certainty, the unit sales associated with or in response to one or more promotional programs, such as shown in plot 42. Retailer 10 uses promotional model 14 to run report 16 from which the retailer makes decisions as to what promotions, and corresponding timing of such programs, will provide the optimal and desired effect under business plan 12. Retailer 10 may project forward in time and predict volume of sales under one or more promotional efforts. The unit sales predictions for various promotional models will help retailer 10 make well-reasoned business decisions. Alternatively, retailer 10 may analyze back in time to understand what may have happened if different decisions had been made. The backcast analysis is particularly useful following a less than successful promotion campaign to understand how things may have been done differently. In any case, promotional model 14 gives retailer 10 far more information than previously available to make good business decisions.

In the normal course of business, retailer 10 collects a significant amount of data. Customer 24 patronizes a store, makes one or more product selections, places the items in a basket, and proceeds to the checkout counter. The contents of the basket containing one or more products is a retail transaction. Most retail transactions are entered into a computer system.

Figure 4:
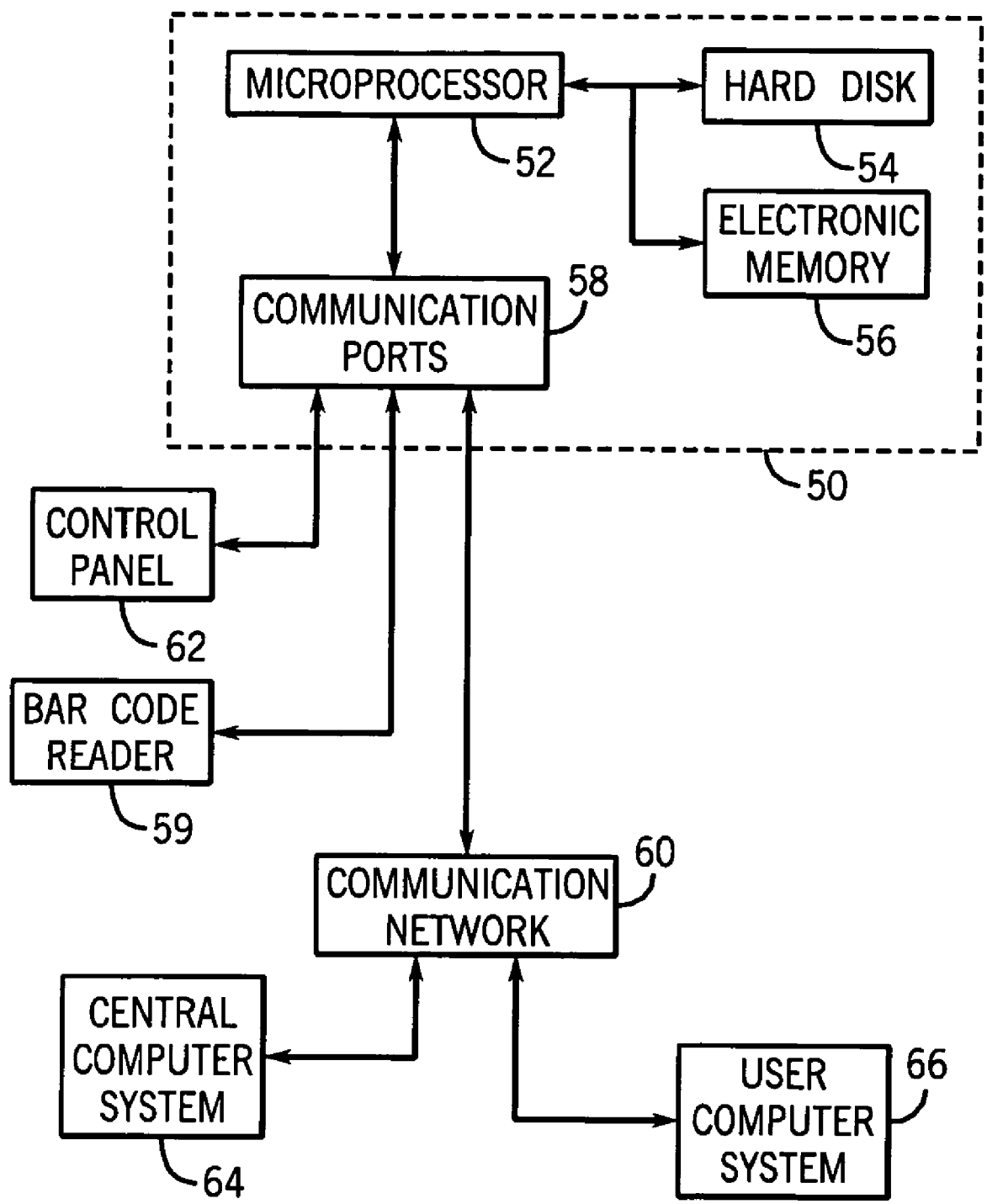
FIG. 4 is a computer system for storing customer transactional data and executing the promotional model.

A general purpose computer 50, as shown in FIG. 4, includes central processing unit or microprocessor 52, mass storage device or hard disk 54, electronic memory 56, and communication ports 58. Computer 50 runs application software for managing retail sales. Each product includes Universal Product Code (UPC) or barcode label. The barcode is encoded with a unique identification number for the product. The product is scanned over a barcode reader at the store checkout counter to read the UPC identification number. Barcode reader 59 is connected to communication port 58 to transfer the UPC data to computer 50. Computer 50 may be part of a computer network which connects multiple barcode readers in many stores to central computer system 64.

From the UPC data, a product database on hard disk 54 retrieves the price for the product and any promotional initiatives. As each product from the customer's basket is scanned, computer 50 builds up a transaction in temporary file space on hard disk 54. Once the transaction is complete and customer 24 has paid, the transaction becomes a permanent record in the sales transaction log or database on hard disk 54, or as part of central computer system 64.

Another product feature which can be used by retailer 10 is radio frequency identification tags (RFID). The RFID tag can be attached to products to track time dependent status such as date codes, inventory, and shelf stock. The RFID contains product information such as individual product identification, time, and location. The RFID information is transmitted to a receiving unit which interfaces with the store's computer system. Retailer 10 can track shelf life for perishable items and manage product rotation, ordering, inventory, and sales over time. If a quantity of perishable product is nearing its end of shelf life, then that product is a prime candidate for promotion to move the about-to-expire items. It is much more efficient for retailer 10 to discount the product rather than have to destroy the merchandise. Retailer 10 will also know when inventory is low due to the promotion and needed to be restocked or order more. The location of the RFID tagged product can be monitored to see how display location within the store effects product sales. The time of the sale, e.g. day, month, year, is important in determining the distribution of the unit sales over time. The RFID information represents useful observable data.

The transaction log (TLOG) contains one or more line items for each retail transaction, such as shown in Table 1. Each line item includes information such as store number, product number, time of transaction, transaction number, quantity, current price, profit, promotion number, and customer number. The store number identifies specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion for the product, e.g. flyer, ad, sale price, coupon, rebate, end-cap, etc; customer number identifies the customer by type, class, region, or individual, e.g. discount card holder, government sponsored or under-privileged, volume purchaser, corporate entity, preferred customer, or special member. The TLOG data is accurate, observable, and granular product information based on actual retail transactions within the store. TLOG data represents the known and observable results from the customer buying decision or process. The TLOG data may contain thousands of transactions for retailer 10 per store $S_i$ per day, or millions of transactions per chain of stores per day.

TABLE 1

TLOG Data

| Store | Product | Time | Trans | Qty | Price | Profit | Promotion | Customer |
|---|---|---|---|---|---|---|---|---|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

A simplified example of TLOG data is shown in Table 1. The first line item shows that on day/time D1 (date and time), store S1 had transaction T1 in which customer C1 purchased one product P1 at 1.50. The next two line items also refer to transaction T1 and day/time D1, in which customer C1 also purchased two products P2 at 0.80 each and three products P3 at price 3.00 each. In transaction T2 on day/time D1, customer C2 has four products P4 at price 1.80 each and one product P5 at price 2.25. In transaction T3 on day/time D1, customer C3 has ten products P6 at 2.65 each, in his or her basket. In transaction T1 on day/time D2 (different day and time) in store S1, customer C4 purchased five products P1 at price 1.50 each. In store S2, transaction T1 with customer C5 on day/time D3 (different day and time) involved one product P7 at price 5.00. In store S2, transaction T2 with customer C6 on day/time D3 involved two products P1 at price 1.50 each and one product P8 at price 3.30.

The TLOG data in Table 1 further shows that product P1 in transaction T1 had promotion PROMO1. For the present discussion, PROMO1 shall be a front-page featured item in a local flyer. Product P2 in transaction T1 had promotion PROMO2, which is an end-cap display in store S1. Product P3 in transaction T1 had promotion PROMO3, which is a reduced sale price. Product P4 in transaction T2 on day/time D1 had no promotional offering. Likewise, product P5 in transaction T2 had no promotional offering. Product P6 in transaction T3 on day/time D1 had promotion PROMO4, which is a volume discount for 10 or more items. Product P7 in transaction T1 on day/time D3 had promotion PROMO5, which is a 0.50 rebate. Product P8 in transaction T2 had no promotional offering. A promotion may also be classified as a combination of promotions, e.g. flyer with sale price or end-cap with rebate.

Retailer 10 also provides additional information to the TLOG database or other logical storage area of hard disk 54 such as promotional calendar and events, store set-up, shelf location, end-cap displays, flyers, and advertisements. For example, the information associated with a flyer distribution, e.g. publication medium, run dates, distribution, product location within flyer, and advertised prices, is stored with TLOG data on hard disk 54. The store set-up, including location of products, special displays, in-store price specials, celebrity visitations, and physical amenities, is made available to the TLOG database.

Communication port 58 may connect by a high-speed Ethernet link to communication network 60. Communication network 60 may have dedicated communication links between multiple computers, or an open architecture system such as the World Wide Web, commonly known as the Internet. Retailer 10 can access computer 50 remotely through communication network 60. Retailer 10 stores TLOG data on computer 50 or central computer system 64. The TLOG data is used for a variety of functions such as financial reporting, inventory control, and planning. The TLOG data is also available to use with promotional model 14, as described hereinafter.

In one embodiment, promotional model 14 is application software or computer program residing on computer 50, central computer system 64, or computer system 66. The software is originally provided on computer readable media, such as compact disks (CDs), or downloaded from a vendor website, and installed on the desired computer. In one case, promotional model 14 can be executed directly on computer 50, which may be located in the facilities of retailer 10. Retailer 10 interacts with computer 50 through user control panel 62, which may take the form of a local computer terminal, to run promotional model 14 and generate report 16. Alternatively, retailer 10 uses computer system 66 to access promotional model 14 remotely, e.g. through a website contained on hard disk 54. Retailer 10 can make requests of a third party who in turn runs promotional model 14 and generates report 16 on behalf of the retailer. The requests to generate report 16 may be made to the third party through the website or other communication medium.

Promotional model 14 operates under the premise that an expectation of unit sales of product $P_i$, over time, can be defined by statistical representations of certain component(s) or factor(s) involved in customer purchasing decisions. The model may comprise a set of one or more factors. The customer buying decision involves the customer response or behavior to a number of conditions that lead to a decision to purchase or not purchase a given product. In one embodiment, the expected value of units sales of product $P_i$ $\langle US_{pi} \rangle$ is defined as a multiplicative or product combination of expected values of customer traffic, share of product (selecting a specific product), and count (quantity) of selected product, which are factors related to the customer buying decision. The expected value of units sales of product $P_i$ is given in equation (1) as:

$$\langle US_{pi} \rangle = \langle TRAFFIC \rangle \langle SHARE \rangle \langle COUNT \rangle \quad (1)$$

where: $\langle TRAFFIC \rangle$ is the expected value of total customer traffic shopping in store $S_i$ $\langle SHARE \rangle$ is the expected value of the probability of selecting a specific product or group of products $P_i$ $\langle COUNT \rangle$ is the expected value of the quantity of $P_i$ purchased for customers who bought $P_i$ The customer traffic, selecting a product, and quantity of selected products form the set of factors representing components of the customer buying decision. Each of the set of factors is defined in part using a set of causal parameters related to the customer buying decision or process. The set of parameters are set forth in utility functions U(t), as described hereinafter, and contained within the expected values of traffic, share, and count. One or more of the values of the set of parameters are functions of time. Thus, the expected values are one type of statistical relationship which relates the set of factors to the customer buying decision process. The observable TLOG data, such as transaction, product, price, and promotion, is used to solve for the set of parameters contained in the utility function U(t).

For the expectation of customer traffic, i.e. the total number of customers that will patronize store $S_i$ in a specified time period, the expected value is defined in terms of an exponential function of the utility function parameters, given in equation (2) as:

$$\langle TRAFFIC \rangle = e^{U_T(t)} \quad (2)$$

The traffic utility function $U_T(t)$ is derived from certain attributes and parameters, as a function of time, related to customer decisions involved in selecting store $S_i$. With respect to equation (2), the utility function for the expectation of traffic is given in equation (3) as:

$$U_T(t) = Q_0 + \alpha t + f_T(t) \quad (3)$$

where: $Q_0$ is base transaction rate for store $S_i$ $\alpha$ is growth rate for store $S_i$ t is time period (e.g. hour, day, week)

$f_T(t)$ is time dependent function of coefficients $$f_T(t) = C_{TQ1}\theta_{Q1}(t) + C_{TQ2}\theta_{Q2}(t) + C_{TQ3}\theta_{Q3}(t) + C_{TQ4}\theta_{Q4}(t) \quad (4)$$

where: $\theta_{Q1}(t)$ is indicator function for quarter Q1

$\theta_{Q2}(t)$ is indicator function for quarter Q2

$\theta_{Q3}(t)$ is indicator function for quarter Q3

$\theta_{Q4}(t)$ is indicator function for quarter Q4

$C_{TQ1}$ is traffic coefficient for quarter Q1

$C_{TQ2}$ is traffic coefficient for quarter Q2

$C_{TQ3}$ is traffic coefficient for quarter Q3

$C_{TQ4}$ is traffic coefficient for quarter Q4

Coefficients $C_{TQ1}$-$C_{TQ4}$ are parameters which collectively define the driving forces behind store traffic for each time period. The indicator function $\theta_{Q1}(t)$ has value 1 during quarter Q1 and is zero otherwise; indicator function $\theta_{Q2}(t)$ has value 1 during quarter Q2 and is zero otherwise; indicator function $\theta_{Q3}(t)$ has value 1 during quarter Q3 and is zero otherwise; indicator function $\theta_{Q4}(t)$ has value 1 during quarter Q4 and is zero otherwise.

The indicator functions may represent any arbitrary set of time periods. The set represented may be periodic, e.g., day of week or month of year. The indicator functions may be recurring holidays, e.g., week before Christmas or Memorial day, or may represent non-contiguous non-recurring sets of time periods that have a relationship to the decision utility in the minds of the customers.

To evaluate $U_T(t)$ as per equation (3), the observable TLOG data in Table 1 is used to determine the number of transactions (baskets of merchandise) per store, per time period. According to the observable data in Table 1, the number of transactions (baskets) B for day/time D1 is B(D1)=3; for day/time D2 is B(D2)=1; for day/time D3 is B(D3)=2. Hence, there exists a set of observations from the TLOG data of Table 1 given as observed baskets $B_{obs}$: {B(D1), B(D2), B(D3)}, which provide an objective, observable realization of the historical transaction process over time.

Next, a likelihood function is assigned for the expectation of customer traffic in each store $S_i$. In the present discussion, the Poisson distribution is used to define the probability that a given number of customers have decided to shop in store $S_i$, i.e. has entered the store with the intent to make purchase(s), as shown in equation (5):

$$P(n) = \frac{\langle TRAFFIC \rangle^n e^{-\langle TRAFFIC \rangle}}{n!} \quad (5)$$

where: n is the number baskets B for a given time $\langle TRAFFIC \rangle$ is expectation of traffic in store $S_i$, i.e. expectation of seeing any given number of baskets B in store $S_i$ on a given day $D_i$ Other likelihood functions such as Multinomial can be used, for example, when considering market share of the products. In the present case, the probability of the observed set of baskets $P(B_{obs})$, is given in equation (6) as a multiplicative or product combination of the probability of each observation within the set of observations. To evaluate $P(B_{obs})$ in equation (6), each observation of the set of observations {B(D1), B(D2), B(D3)} is evaluated within the Poisson function P(n) of equation (5), i.e. P(B(D1)), P(B(D2)), and P(B(D3)), which are given in equations (7)-(9).

$$P(B_{obs}) = P(B(D1)) * P(B(D2)) * P(B(D3)) \quad (6)$$

$$P(B(D1)) = \frac{\langle TRAFFIC \rangle^{B(D1)} e^{-\langle TRAFFIC \rangle}}{B(D1)!} \quad (7)$$

$$P(B(D2)) = \frac{\langle TRAFFIC \rangle^{B(D2)} e^{-\langle TRAFFIC \rangle}}{B(D2)!} \quad (8)$$

$$P(B(D3)) = \frac{\langle TRAFFIC \rangle^{B(D3)} e^{-\langle TRAFFIC \rangle}}{B(D3)!} \quad (9)$$

The likelihood function $P(B_{obs})$ in equation (6) is maximized using the Maximum Likelihood Method to evaluate the observable TLOG data within the Poisson probability function, and thereby solve for and calibrate the parameters of $U_T(t)$, which are unknown at the present time. Recall that $\langle TRAFFIC \rangle$ is a function of $U_T(t)$ as defined in equation (3). $P(B_{obs})$ is thus a function of the parameters of $U_T(t)$, i.e. $Q_0$, $\alpha$, $C_{TQ1}$, $C_{TQ2}$, $C_{TQ3}$, $C_{TQ4}$, as per equations (3)-(4). As described above, the parameters of $U_T(t)$ are contained within the factors that are related to the customer buying decision.

To solve for the parameters of $U_T(t)$, a parameter vector V: {$Q_0$, $\alpha$, $C_{TQ1}$, $C_{TQ2}$, $C_{TQ3}$, $C_{TQ4}$} is defined. The goal is to resolve the parameter vector V into a set of values which maximizes the magnitude of $P(B_{obs})$. The function $P(B_{obs})$ can be visualized as a response surface in n-dimensional space which has a maximum or peak value. The Maximum Likelihood Method is an iterative process in which the parameter vector V is updated each iteration until the maximum value for $P(B_{obs})$ is found.

Accordingly, an initial set of values for each parameter of the vector V is estimated to create initial parameter vector $V_0$. The estimation of initial values for $V_0$ may come from historical data, or merely an educated guess. The function P(B(D1)) is evaluated using the observed value B(D1) from Table 1 and the initial parameter vector $V_0$ to obtain a first value for P(B(D1)). The function P(B(D2)) is evaluated using the observed value B(D2) from Table 1 and the initial parameter vector $V_0$ to obtain a first value for P(B(D2)). The function P(B(D3)) is evaluated using the observed value B(D3) from Table 1 and the initial parameter vector $V_0$ to obtain a first value for P(B(D3)). A first value of $P(B_{obs})$ is calculated in equation (6) from the product combination of the first values of P(B(D1))*P(B(D2))*P(B(D3)).

Another set of values for each parameter of V is estimated, again using historical data or an educated guess, to create parameter vector $V_1$. The function P(B(D1)), given the observed value B(D1) and the parameter vector $V_1$, is evaluated to obtain a second value for P(B(D1)). The function P(B(D2)) is evaluated using the observed value B(D2) and the parameter vector $V_1$ to obtain a second value for P(B(D2)). The function P(B(D3)) is evaluated using the observed value B(D3) and the parameter vector $V_1$ to obtain a second value for P(B(D3)). A second value of $P(B_{obs})$ is calculated in equation (6) from the product combination of the second values of P(B(D1))*P(B(D2))*P(B(D3)).

If the second value of $P(B_{obs})$ is greater than the first value of $P(B_{obs})$, then the second value of $P(B_{obs})$ is closer to the solution of finding the maximum value of $P(B_{obs})$. The second value of $P(B_{obs})$ is a better solution than the first value, i.e. the second estimate is moving in the correct direction, up the response surface of $P(B_{obs})$ toward the optimal maximum solution. If the second value of $P(B_{obs})$ is not greater than the first value of $P(B_{obs})$, then another parameter vector $V_1$ is estimated. The values are re-calculated and, if necessary, re-estimated until the second value of $P(B_{obs})$ is greater than the first value of $P(B_{obs})$.

A third set of values for each parameter of V is estimated, e.g. $V_2 = V_1 + (V_1 - V_0)$ or other educated guess, to create parameter vector $V_2$. The process of choosing iterative sets of values for the parameter vector V can take a variety of approaches. There are many standard and specialized algorithms that may be applied: steepest descent, conjugate-gradient method, Levenberg-Marquardt, and Newton-Raphson, to name a few. The function P(B(D1)) is evaluated using the observed value B(D1) and the parameter vector $V_2$ to obtain a third value for P(B(D1)) The function P(B(D2)) is evaluated using the observed value B(D2) and the parameter vector $V_2$ to obtain a third value for P(B(D2)). The function P(B(D3)) is evaluated using the observed value B(D3) and the parameter vector $V_2$ to obtain a third value for P(B(D3)). A third value of $P(B_{obs})$ is calculated in equation (6) from the product combination of the third values of P(B(D1))*P(B(D2))*P(B(D3)).

If the third value of $P(B_{obs})$ is greater than the second value of $P(B_{obs})$, then the third value of $P(B_{obs})$ is closer to the solution of the maximum value of $P(B_{obs})$. If the third value of $P(B_{obs})$ is not greater than the second value of $P(B_{obs})$, then another parameter vector $V_2$ is estimated. The values are re-calculated and, if necessary, re-estimated until the third value of $P(B_{obs})$ is greater than the second value of $P(B_{obs})$.

The Maximum Likelihood Method repeats until the difference between the j-th value of $P(B_{obs})$ and the j+1-th value of $P(B_{obs})$ is less than an error threshold $\epsilon$, or until a stopping criteria has been reached, wherein iterative solutions of $P(B_{obs})$ are no longer changing by an appreciable or predetermined amount. The error threshold $\epsilon$ or stopping criteria is selected according to desired tolerance and accuracy of the solution.

Assume that the parameter vector V has reached a solution of values for $Q_0, \alpha, C_{TQ1}, C_{TQ2}, C_{TQ3}, C_{TQ4}$, using the Maximum Likelihood Method, which provides the maximum value for the likelihood function using the Poisson probability distribution $P(B_{obs})$. With the parameters of $U_T(t)$ now known, the utility function UT(t) is thus completely defined as per equations (3)-(4), and the expected value of traffic is defined as per equation (2) for the purposes of the model. Each store $S_i$ will have its own solution for $U_T(t)$. Since $U_T(t)$ is a function of time, the expected value of traffic for store $S_i$ can be modeled forward and backward in time. Equation (2) can be evaluated for any time t to predict the expected value of customer traffic in store $S_i$.

Turning now to computing the expected value of share in equation (1). In this case, the share is an expectation of a probability. The expected value of share is given in equation (10) as a function of exponential time dependent utility functions:

$$\langle SHARE \rangle = \frac{e^{U_S(t)}}{1+e^{U_S(t)}} \quad (10)$$

The utility function $U_S(t)$ for the expected value of share is defined using a set of parameters or attributes, as a function of time, related to customer decisions involved in selecting at least one product $P_i$. The share utility function $U_S(t)$ is defined at the product level, within store $S_i$, and has specific promotions associated with the various products. With respect to equation (10), the utility function for the expectation of share is given in equations (11)-(13) as:

$$U_S(t) = V(t) - \beta\left(\frac{P-P_0}{P_0}\right) + f_S(t) \quad (11)$$

where: V(t) is time dependent base rate of sales for product $P_i$
$\beta$ is price response for product $P_i$
P is price from TLOG data
$P_0$ is reference price, e.g. baseline price
$f_S(t)$ is time dependent function of share coefficients $$V(t) = V_{REG}\theta_{REG}(t) + V_{PROMO1}\theta_{PROMO1}(t) + V_{PROMO2}\theta_{PROMO2}(t) \quad (12)$$

$$f_S(t) = C_{SQ1}\theta_{Q1}(t) + C_{SQ2}\theta_{Q2}(t) + C_{SQ3}\theta_{Q3}(t) + C_{SQ4}\theta_{Q4}(t) \quad (13)$$

where: $\theta_{REG}(t)$ is indicator function for regular price
$\theta_{PROMO1}(t)$ is indicator function for promotion 1
$\theta_{PROMO2}(t)$ is indicator function for promotion 2
$V_{REG}$ is the rate of sales for regular product status, i.e. no promotion
$V_{PROMO1}$ is rate of sales for first promotion
$V_{PROMO2}$ is rate of sales for second promotion
$C_{SQ1}$ is share coefficient for quarter Q1
$C_{SQ2}$ is share coefficient for quarter Q2
$C_{SQ3}$ is share coefficient for quarter Q3
$C_{SQ4}$ is share coefficient for quarter Q4

Promotion coefficients $\beta$, $V_{REG}$, $V_{PROMO1}$, $V_{PROMO2}$, $C_{SQ1}$, $C_{SQ2}$, $C_{SQ3}$, $C_{SQ4}$ are parameters which collectively define the driving forces associated with rate of sales or promotional lift for product $P_i$. The indicator function $\theta_{REG}(t)$ has value 1 during a first time period associated with no promotion and is zero otherwise; indicator function $\theta_{PROMO1}(t)$ has value 1 during a second time period associated with promotion 1 and is zero otherwise; indicator function $\theta_{PROMO2}(t)$ has value 1 during a third time period associated with promotion 2 and is zero otherwise. For example, $\theta_{REG}(t)$ may be value 1 during any day, week, or month when there is no promotion in place, i.e. regular price. $V_{REG}$, rate of sales of product $P_i$ under regular status (no promotion), is in effect when $\theta_{REG}(t) = 1$. $\theta_{PROMO1}(t)$ may be value 1 during a time period when promotion 1 is in effect. The rate of sales of product $P_i$ under promotion 1 ($V_{PROMO1}$) factors into $U_S(t)$ when $\theta_{PROMO1}(t) = 1$. $\theta_{PROMO2}(t)$ may be value 1 during a time period when promotion 2 is in effect. The rate of sales of product $P_i$ under promotion 2 ($V_{PROMO2}$) factors into $U_S(t)$ when $\theta_{PROMO2}(t)=1$. One or more indicator functions $\theta_{REG}(t)$, $\theta_{PROMO1}(t)$, and $\theta_{PROMO2}(t)$ may be enabled at any given time.

To evaluate $U_S(t)$ as per equation (11), the observable data in Table 1 is used to determine the number of transactions $b(t)$ (baskets of merchandise) containing at least one product $P_i$, per store, per time period, and the total number of transactions $B(t)$ in store $S_i$ per time period. Equation (14) defines the relationship between $b(t)$, $B(t)$, and expected value of share.

$$b(t)=B(t)\langle SHARE \rangle \quad (14)$$

Define a set of observable data from Table 1, $b_{OBS}$: $\{b(D1), b(D2), b(D3)\}$, where $b(D1)$ is number of transactions or baskets containing at least one product P1 for day/time D1, $b(D2)$ is number of transactions containing at least one product P1 for day/time D2, and $b(D3)$ is number of transactions containing at least one product P1 for day/time D3. From Table 1, the observable TLOG data, with respect to product P1, shows $b(D1)=2$, $b(D2)=0$, and $b(D3)=1$. The set of observable transaction data $B_{OBS}$: $\{B(D1), B(D2), D(D3)\}$ is defined in the above discussion of the traffic utility function. Hence, there exists from the TLOG data of Table 1 an observable realization of the product selection process per product $P_i$ over time.

Next, a likelihood function is assigned for the expectation of share for each product $P_i$, in each store $S_i$. In the present discussion, the Binominal distribution is used to define the probability that customer 24 has decided to purchase at least one product $P_i$, i.e. has placed product $P_i$ in the basket with the intent to make a purchase:

$$P(b \mid B) = \langle SHARE \rangle^b (1 - \langle SHARE \rangle)^{B-b} \frac{B!}{b!(B-b)!} \quad (15)$$

Each of the set of observations $\{b(D1), b(D2), b(D3)\}$ is evaluated within the Binominal function $P(b|B)$ of equation (15), as the probability of $b(t)$ given total number of transactions $B(t)$, and set forth in equations (16)-(19).

$$P(b_{OBS} \mid B_{OBS}) = \quad (16)$$
$$P(b(D1) \mid B(D1)) * P(b(D2) \mid B(D2)) * P(b(D3) \mid B(D3))$$

$$P(b(D1) \mid B(D1)) = \quad (17)$$
$$\langle SHARE \rangle^{b(D1)}(1 - \langle SHARE \rangle)^{B(D1)-b(D1)} \frac{B(D1)!}{b(D1)!(B(D1) - b(D1))!}$$

$$P(b(D2) \mid B(D2)) = \quad (18)$$
$$\langle SHARE \rangle^{b(D2)}(1 - \langle SHARE \rangle)^{B(D2)-b(D2)} \frac{B(D2)!}{b(D2)!(B(D2) - b(D2))!}$$

$$P(b(D3) \mid B(D3)) = \quad (19)$$
$$\langle SHARE \rangle^{b(D3)}(1 - \langle SHARE \rangle)^{B(D3)-b(D3)} \frac{B(D3)!}{b(D3)!(B(D3) - b(D3))!}$$

The likelihood function $P(b_{OBS}|B_{OBS})$ in equation (16) is maximized using the Maximum Likelihood Method, in a similar manner as described above for equations (6)-(9), to solve for the parameters $U_S(t)$. Recall that $\langle SHARE \rangle$ is a function of $U_S(t)$ as defined in equation (10). $P(b(D1)|B(D1))$ is thus a function of the parameters of $U_S(t)$, i.e. $\beta$, $V_{REG}$, $V_{PROMO1}$, $V_{PROMO2}$, $C_{SQ1}$, $C_{SQ2}$, $C_{SQ3}$, $C_{SQ4}$, as per equations (11)-(13). However, the parameters of $U_S(t)$ are unknown at the present time.

To solve for the parameters of $U_S(t)$, a parameter vector W: $\{\beta, V_{REG}, V_{PROMO1}, V_{PROMO2}, C_{SQ1}, C_{SQ2}, C_{SQ3}, C_{SQ4}\}$ is defined. The goal is to resolve the parameter vector W into a set of values which maximizes the magnitude of $P(b_{OBS}|B_{OBS})$. The function $P(b_{OBS}|B_{OBS})$ can be visualized as a response surface in n-dimensional space which has a maximum or peak value. The Maximum Likelihood Method is an iterative process in which the parameter vector W is updated each iteration until the maximum value for $P(b_{OBS}|B_{OBS})$ is found.

Accordingly, an initial set of values for each parameter of the vector W is estimated to create initial parameter vector $W_0$. The estimation of initial values for $W_0$ may come from historical data, or merely an educated guess. The function $P(b(D1)|B(D1))$ is evaluated using the observed values $b(D1)$ and $B(D1)$ from Table 1 and the initial parameter vector $W_0$ to obtain a first value for $P(b(D1)|B(D1))$. The function $P(b(D2)|B(D2))$ is evaluated using the observed values $b(D2)$ and $B(D2)$ from Table 1 and the initial parameter vector $W_0$ to obtain a first value for $P(b(D2)|B(D2))$. The function $P(b(D3)|B(D3))$ is evaluated using the observed values $b(D3)$ and $B(D3)$ from Table 1 and the initial parameter vector $W_0$ to obtain a first value for $P(b(D3)|B(D3))$. A first value of $P(b_{OBS}|B_{OBS})$ is calculated in equation (16) from the product combination of the first values of $P(b(D1)|B(D1))*P(b(D2)|B(D2))*P(b(D3)|B(D3))$.

Another set of values for each parameter of W is estimated, again using historical data or an educated guess, to create parameter vector $W_1$. The function $P(b(D1)|B(D1))$ is evaluated using the observed values $b(D1)$ and $B(D1)$ and the parameter vector $W_1$ to obtain a second value for $P(b(D1)|B(D1))$. The function $P(b(D2)|B(D2))$ is evaluated using the observed values $b(D2)$ and $B(D2)$ and the parameter vector $W_1$ to obtain a second value for $P(b(D2)|B(D2))$. The function $P(b(D3)|B(D3))$ is evaluated using the observed values $b(D3)$ and $B(D3)$ and the parameter vector $W_1$ to obtain a second value for $P(b(D3)|B(D3))$. A second value of $P(b_{OBS}|B_{OBS})$ is calculated in equation (16) from the product combination of the second values of $P(b(D1)|B(D1))*P(b(D2)|B(D2))*P(b(D3)|B(D3))$.

If the second value of $P(b_{OBS}|B_{OBS})$ is greater than the first value of $P(b_{OBS}|B_{OBS})$, then the second value of $P(b_{OBS}|B_{OBS})$ is closer to the solution of finding the maximum value of $P(b_{OBS}|B_{OBS})$. The second value of $P(b_{OBS}|B_{OBS})$ is a better solution than the first value, i.e. the second estimate is moving in the correction direction, up the response surface of $P(b_{OBS}|B_{OBS})$ toward the optimal maximum solution. If the second value of $P(b_{OBS}|B_{OBS})$ is not greater than the first value of $P(b_{OBS}|B_{OBS})$, then another parameter vector $W_1$ is estimated. The values are re-calculated and, if necessary, re-estimated until the second value of $P(b_{OBS}|B_{OBS})$ is greater than the first value of $P(b_{OBS}|B_{OBS})$.

A third set of values for each parameter of W is estimated, e.g. $W_2=W_1+(W_1-W_0)$ or other educated guess, to create parameter vector $W_2$. Again, the process of choosing iterative sets of values for the parameter vector W can take a variety of approaches: steepest assent, gradient method, Levenberg-Marquadt, Newton-Raphson. The function $P(b(D1)|B(D1))$ is evaluated using the observed values $b(D1)$ and $B(D1)$ and the parameter vector $W_2$ to obtain a third value for $P(b(D1)|B(D1))$. The function $P(b(D2)|B(D2))$ is evaluated using the observed values $b(D2)$ and $B(D2)$ and the parameter vector $W_2$ to obtain a third value for $P(b(D2)|B(D2))$. The function $P(b(D3)|B(D3))$ is evaluated using the observed values $b(D3)$ and $B(D3)$ and the parameter vector $W_2$ to obtain a third value for $P(b(D3)|B(D3))$. A third value of $P(b_{OBS}|B_{OBS})$ is calculated in equation (16) from the product combination of the third values of P(b(D1)|B(D1)))*P(b(D2)|B(D2))*P(b(D3)|B(D3)).

If the third value of P($b_{OBS}|B_{OBS}$) is greater than the second value of P($b_{OBS}|B_{OBS}$), then the third value of P($b_{OBS}|B_{OBS}$) is closer to the solution of the maximum value of P ($b_{OBS}|B_{OBS}$). If the third value of P($b_{OBS}|B_{OBS}$) is not greater than the second value of P($b_{OBS}|B_{OBS}$), then another parameter vector $V_2$ is estimated. The values are re-calculated and, if necessary, re-estimated until the third value of P($b_{OBS}|B_{OBS}$) is greater than the second value of P($b_{OBS}|B_{OBS}$).

The Maximum Likelihood Method repeats until the difference between the j-th value of P($b_{OBS}|B_{OBS}$) and the j+1-th value of P($b_{OBS}|B_{OBS}$) is less than an error threshold $\epsilon$, or until a stopping criteria has been reached, wherein iterative solutions of P($b_{OBS}|B_{OBS}$) are no longer changing by an appreciable or predetermined amount. The error threshold $\epsilon$ or stopping criteria is selected according to desired tolerance and accuracy of the solution.

Assume that the parameter vector W has reached a solution of values for $\beta$, $V_{REG}$, $V_{PROMO1}$, $V_{PROMO2}$, $C_{SQ1}$, $C_{SQ2}$, $C_{SQ3}$, $C_{SQ4}$, using the Maximum Likelihood Method, which provides the maximum value for the likelihood function P($b_{OBS}|B_{OBS}$). With the parameters of $U_S(t)$ now known, the utility function $U_S(t)$ is thus defined as per equation (11), and the expected value of share is defined as per equation (10). Each product $P_i$ will have its own solution for $U_S(t)$. Since $U_S(t)$ is a function time, the expected value of share for product $P_i$ can be modeled forward and backward in time. Equation (10) can be evaluated for any time t to predict the expected value of share for each product $P_i$.

Turning to computation of the expected value of count in equation (1). In one embodiment, the expected value of count is an average of the quantity of items of product $P_i$ in those baskets containing at least one product $P_i$, given in equation (20) as:

$$\langle COUNT \rangle = \frac{\sum_{t=1}^{N} C(t)}{N} \quad (20)$$

Alternatively, the expected value of count is defined in terms of a probability distribution. In equation (21), $P_a$ is the probability of accepting one more item of product $P_i$, given that customer 24 has already selected at least one product $P_i$. In equation (22), the expected value of count is given in terms of $P_a$.

$$P_a = \frac{e^{U_C(t)}}{1 + e^{U_C(t)}} \quad (21)$$

$$\langle COUNT \rangle = \frac{1}{1 - P_a} \quad (22)$$

The utility function $U_C(t)$ for the expected value of count is defined using attributes and parameters, as a function of time, related to customer decisions involved in selecting a specific quantity of product $P_i$, given that customer 24 has chosen to purchase at least one product $P_i$. The count utility function $U_C(t)$ is defined at the product level, within store $S_i$, and has specific promotions associated with the various products. With respect to equation (21), the utility function for the expectation of count is given in equations (23)-(25) as:

$$U_C(t) = V(t) - \beta \left( \frac{P - P_0}{P_0} \right) + f_C(t) \quad (23)$$

where: $f_C(t)$ is time dependent function of share coefficients $$V(t) = V_{REG}\theta_{REG}(t) + V_{PROMO1}\theta_{PROMO1}(t) + V_{PROMO2}\theta_{PROMO2}(t) \quad (24)$$

$$f_C(t) = C_{CQ1}\theta_{Q1}(t) + C_{CQ2}\theta_{Q2}(t) + C_{CQ3}\theta_{Q3}(t) + C_{CQ4}\theta_{Q4}(t) \quad (25)$$

where: $C_{CQ1}$ is share coefficient for quarter Q1
$C_{CQ2}$ is share coefficient for quarter Q2
$C_{CQ3}$ is share coefficient for quarter Q3
$C_{CQ4}$ is share coefficient for quarter Q4

Promotion coefficients $\beta$, $V_{REG}$, $V_{PROMO1}$, $V_{PROMO2}$, $C_{CQ1}$, $C_{CQ2}$, $C_{CQ3}$, $C_{CQ4}$ are parameters which collectively define the driving forces associated with rate of sales or promotional lift for product $P_i$. To evaluate $U_C(t)$ as per equation (23), the observable data in Table 1 is used to determine the expected value of the count of product $P_i$ in a transaction containing at least one product $P_i$ per store, per time period.

Define a set of observable data from Table 1 for product $P_i$, $C_{OBS}$: {C(D1,T1), C(D1,T2), C(D1,T3), C(D2,T1), C(D3,T1), C(D3,T2)}, where C($D_i$,T1) is the count of items of product $P_i$ in the basket for transaction T1 for time $D_i$, C($D_i$,T2) is the count of items of product $P_i$ in the basket for transaction T2 for time $D_i$, and C($D_i$,T3) is the count of items of product $P_i$ in the basket for transaction T3 for time $D_i$. From Table 1, the observable data, with respect to product P1, shows C(D1,T1)=1, C(D1,T2)=4, C(D2,T1)=5, and C(D3,T2)=2. P(c) for other products $P_i$ and sets of observable data are calculated in a similar manner. Hence, there exists from the TLOG data of Table 1 an observable realization of the count process for product $P_i$ over time.

Next, a likelihood function is assigned for the expectation of count for each product $P_i$, in each store $S_i$. The probability of having c items of product $P_i$ in the basket, given that there is at least one item of product $P_i$ in the basket, is given in equation (26):

$$P(c) = P_a^{c-1}(1 - P_a) \quad (26)$$

The probability of seeing each of the set of observables $C_{OBS}$ is evaluated within the P(c) in equations (27)-(31) as:

$$P(C_{OBS}) = P(C(D1,T1))*P(C(D1,T2))*P(C(D2,T1))*P(C(D3,T2)) \quad (27)$$

$$P(C(D1,T1)) = P_a^{C(D1,T1)-1}(1-P_a) \quad (28)$$

$$P(C(D1,T2)) = P_a^{C(D1,T2)-1}(1-P_a) \quad (29)$$

$$P(C(D2,T1)) = P_a^{C(D2,T1)-1}(1-P_a) \quad (30)$$

$$P(C(D3,T2)) = P_a^{C(D3,T2)-1}(1-P_a) \quad (31)$$

The likelihood function P($C_{OBS}$) in equation (27) is maximized using the Maximum Likelihood Method, in a similar manner as described above for P($B_{OBS}$) in equation (6) and P($b_{OBS}|B_{OBS}$) in equation (16), to solve for the parameters of $U_C(t)$. P($C_{obs}$) is a function of the parameters of $U_C(t)$, i.e. $\beta$, $V_{REG}$, $V_{PROMO1}$, $V_{PROMO2}$, $C_{CQ1}$, $C_{CQ2}$, $C_{CQ3}$, $C_{CQ4}$, as per equation (21). The Maximum Likelihood resolves the parameter vector X: {$\beta$, $V_{REG}$, $V_{PROMO1}$, $V_{PROMO2}$, $C_{CQ1}$, $C_{CQ2}$, $C_{CQ3}$, $C_{CQ4}$} associated with the count utility function $U_C(t)$ using a similar iterative process, until the difference between the j-th value of P($C_{obs}$) and the j+1-th value of P($C_{obs}$) is less than an error threshold $\epsilon$, or a stopping criteria has been reached, wherein iterative solutions of $P(C_{obs})$ are no longer changing by an appreciable amount. The error threshold $\epsilon$ or stopping criteria is selected according to desired tolerance and accuracy of the solution.

Assume that the parameter vector X has reached a solution of values for $\beta$, $V_{REG}$, $V_{PROMO1}$, $V_{PROMO2}$, $C_{CQ1}$, $C_{CQ2}$, $C_{CQ3}$, $C_{CQ4}$, using the Maximum Likelihood Method, which provides the maximum value for the likelihood function $P(C_{obs})$. With the parameters for $U_C(t)$ now known, the utility function $U_C(t)$ is thus defined as per equation (23), and the expected value of count is defined as per equations (21) and (22). Each product $P_i$ will have its own solution for $U_C(t)$. Since $U_C(t)$ is a function time, the expected value of count for product $P_i$ can be modeled forward and backward in time. Equation (22) can be evaluated for any time t to predict the expected value of count for product $P_i$.

With the expected values of customer traffic, share, and count reevaluated in terms of a plurality of parameters, the promotional model 14 is defined as the expected value of unit sales for product $P_i$ as per equation (1). The promotional model 14 gives retailer 10 the ability to forecast or predict economic models, given proposed sets of input data or what-ifs, which have significant impact on its business.

Figure 5:
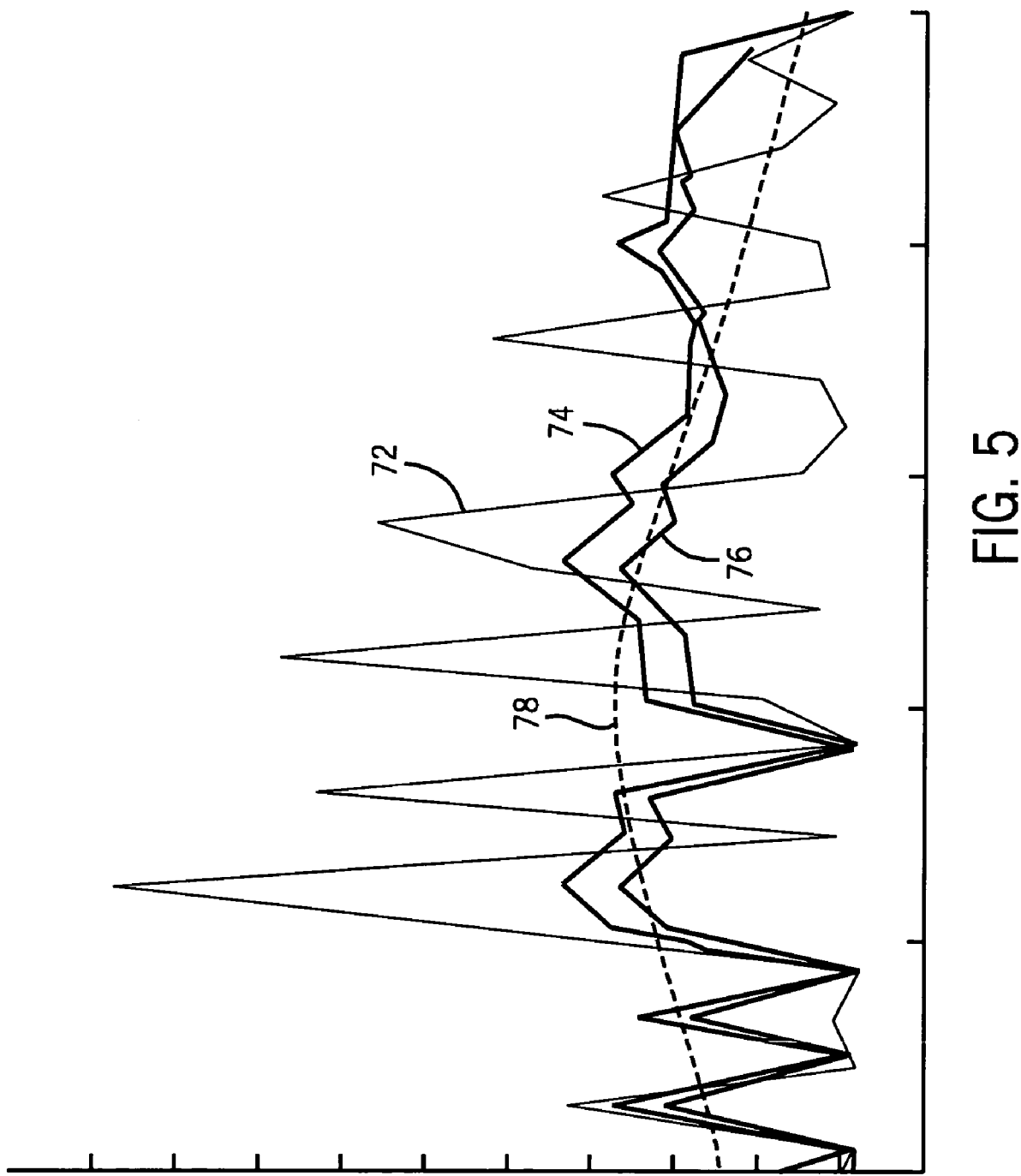
FIG. 5 is a graph of expected value of unit sales of product $P_i$ as a function of time.

A set of graphs for unit sales of one product $P_i$ $\langle US_{P_i} \rangle$ as a function of time is shown in FIG. 5. Plot 72 represents actual unit sales of product $P_i$ sold in store $S_i$ over the time period. Plot 74 represents forecast of product $P_i$ under promotion using promotional model 14. Plot 76 represents baseline (no promotion) of product $P_i$. Plot 78 represents a moving average of units sales of product $P_i$ from plot 72. FIG. 5 illustrates the time series of the expected value of unit sales for product $P_i$ $\langle US_{P_i} \rangle$ has been defined in equation (1) in terms of a product combination of expected values of factors (traffic, share, count) which influence the customer buying decision. Report 16 may include FIG. 5 as part of its forecast information.

The time series of $\langle US_{P_i} \rangle$ illustrates a number of promotional lifts, volume declines, and generally a significant amount of variation in unit sales of product $P_i$. Promotion model 14 also provides additional information to retailer 10, in the form of a table or chart, including (1) baseline of product $P_i$, such as shown in plot 40, (2) observables $B_{OBS}$, $b_{OBS}|B_{OBS}$, and $C_{OBS}$ determined from Table 1, and (3) values of the drivers of $\langle US_{P_i} \rangle$, in terms of the parameters of $U_T(t)$, $U_S(t)$, and $U_C(t)$. The additional information is used to resolve and understand the promotional variation per unit time period seen in FIG. 5. For example, retailer 10 can analyze the difference between $V_{REG}$ and $V_{PROMO}$ at specific points in time to help explain movement in the model.

In another embodiment, combinations of one or more of the expected values of customer traffic, share, and count can be modeled individually or collectively. For example, model 14 may consider the expected value of customer traffic alone, or the expected value of share alone, the expected value of count alone, or the combination of expected values of customer traffic and share. The orientation of the model will be determined in part by the forecast request made by retailer 10.

The above discussion has considered the TLOG data from Table 1 as one embodiment of the data observable from customer responses. The observable data can originate from other sources and with different characteristics, format, and content. In general, the observable data can be categorized as customer response data, causal data, and other data which influences customer buying decisions. Customer response data includes the TLOG data from the checkout counter of customer purchases in the basket, as discussed above in the solution of the expected values of traffic, share, and count. Other sources of customer response data include direct and indirect observations or detection of the customer interest in one or more products. The detection of customer 24 interest in product $P_i$ may be made by observing the customer handle the product. If a particular display or shelf storage of product $P_i$ is regularly found in disarray, even after housekeeping, then it is reasonable to conclude that the customers have been showing sufficient interest to handle the product and read the label, ingredients, and benefits. The store may even use motion sensors to detect where and for how long customers are spending their time. Individual products, especially high price items, may be given sensors to detect when each product has been handled by the customer for consideration of purchase. The store camera system may detect congregations of customers around certain products or displays over time. The camera system can detect eye movement of the customers to see if they are focusing on certain products. Even through the customer did not select the product for purchase, the interest in the product and probability of future purchases may be high.

Another source of customer response data is customer surveys and body counts. The store may entice customers with coupons, gifts, and prizes to participate in surveys which ask what product(s) they have come to shop for, interest in specific products, and their opinions on the store and its products. The store may electronically count customers entering and leaving the store over time to get a temporal distribution of store traffic. The store camera system or sensors may detect how many customers are in each isle or part of the store over time.

Causal data is another form of observable data. Causal data relates to various attributes that cause or induce the customer buying decision. Product attributes include brand, size, color, and form factor. Location attributes involve store, website, and catalog. Customer attributes include loyalty cards and demographics. Promotional attributes include advertisement, price, and incentives. Competitor data considers relative market share, competing price and promotions, store density per geographic area, and product assortment. Calendar data may involve merchandising; e.g. store layout, allocation of space, and display timing; inventory; promotion and price calendar; and demand planning, e.g. holidays, customer cycles, special events, weather, store density per geographic area. Credit card history and loyalty cards provide significant information related to store and product selections. Priors is another type of data which provides information about the expected distribution of parameter values within the model, which may be based on information from prior purchases of similar or different products, mean and standard deviation data from prior transactions, and general trends in the relevant marketplace.

The different types of observable data, customer response data, causal data, and other data related to the customer buying decision, provide significant insight into determining the customer's interests, preferences, likes, dislikes, quirks, and responses to store promotion, layout, product selection, presentation, and arrangement. The process of collecting and analyzing all types of observable data is important to servicing the customer's needs and increasing store profitability.

The observable data can readily be applied to solving parameters which define promotional model 14. As previously discussed, the model comprises one or more factors which relate to the customer buying decision. The factors contain one or more parameters which define the behavior of the model. All of the types of data observable from the customer buying decision, as discussed above, can be used to solve the parameters which in turn completes the model.

FIG. 6 illustrates a summary of creating promotional model 14. Block 80 represents observable data, e.g. customer response data, causal data, priors. Block 82 performs a segmentation process on the observable data to prepare the data for presentation to the modeling program. The segmentation process filters and separates the observable data by location, product, promotion, time, customers, etc., based on a set of logical rules applied to one or more of the data elements included in each transaction. These rules may include restricting the store, product, customer, price, or promotion values to a logical subset of the possible values. The filters may also restrict the customers to those belonging to a specific customer profile. The net result is that the models generated from the segmented data will describe the customer behavior displayed by that particular market segment. Such information may be of great value to retailers seeking to enhance performance through marketing to customer segments or identifying business strategies based on knowledge of customer information.

Block 84 performs an aggregation of the segmented data to prepare the data for modeling. The aggregation phase may transform input data at the rawest granularity to a higher granularity in accordance with the segmentation groupings outlined above. The transformation may include simple summations over the groups, or a more complex functional or logical form. Throughout the discussion, "store" is understood to refer to one of the following: a single sales outlet, location or channel, a specified set of outlets, locations or channels, or a logical grouping of outlets, locations or channels. Similarly, "product" is understood to refer to a single item or service, a specific set of items and/or services, a logical grouping of items or services. The "product" may correspond to a single scan item in a Point of Sale system, or it may correspond to multiple scan items. Customers and promotions may be similarly grouped and labeled for the purposes of data processing and/or modeling. Time periods are arbitrary but presumed uniform, e.g., hour, day, week, etc. The aggregation process allows observable data to be grouped within stable and relatively constant causal indicators.

Block 86 calibrates the model by solving for the unknown parameters. Block 88 stores the parameters on hard disk 54 or other accessible database for later use by customer response model 14.

In FIG. 7, the proposed model data (proposed prices, promotions, time period, etc.) and solved model parameters from blocks 90 and 92 are executed by the model. Customer response model 14 runs the forecast in block 94 using the proposed model data and generates report 16 in block 96.

In FIG. 8, a promotional evaluation builds a model baseline in block 100 using the solved parameters and historical data. The model baseline represents expected sales without promotion. Block 102 compares the model baseline to actuals to determine lift in unit sales attributed to the promotion. Block 104 generates report 16.

Figure 9:
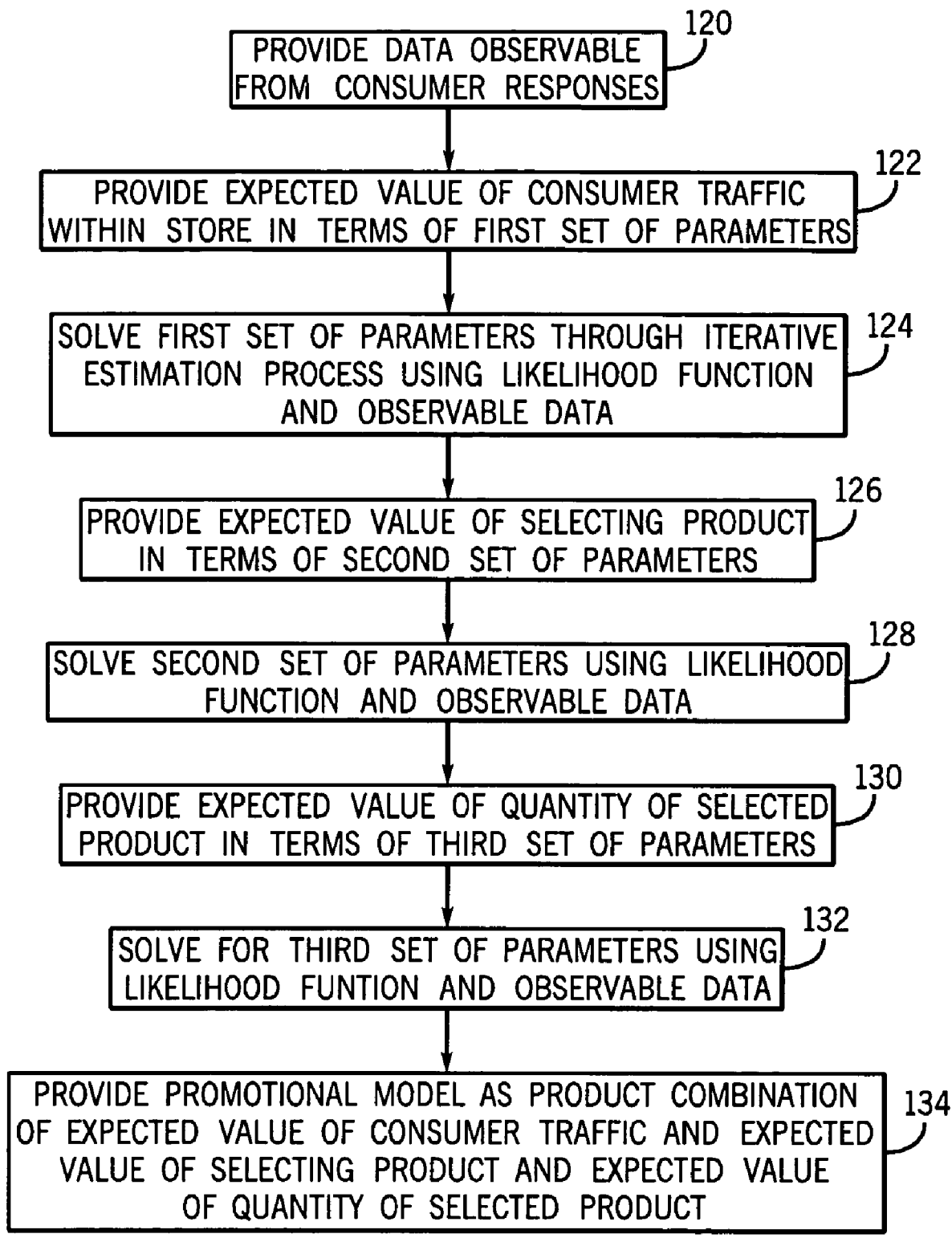
FIG. 9 illustrates the steps of providing a promotional model using observable data from customer purchase decisions.

The process of forecasting a promotional model using observable data from customer purchase decisions is shown in FIG. 9. Step 120 provides data observable from customer responses. The observable data includes transaction, product, price, and promotion. Step 122 provides an expected value of customer traffic within a store in terms of a first set of parameters. The expected value of customer traffic is an exponential function of the first set of parameters. A likelihood function using the Poisson distribution is also defined for the customer traffic. Step 124 solves the first set of parameters through an iterative estimation process using the likelihood function and the observable data. Step 126 provides an expected value of selecting a product in terms of a second set of parameters. The expected value of selecting a product is comprised of exponential functions of the second set of parameters. A likelihood function using the Binominal distribution is also defined for selecting a product. Step 128 solves the second set of parameters using the likelihood function and the observable data. Step 130 provides an expected value of quantity of selected product in terms of a third set of parameters. A likelihood function is also defined for the quantity of selected product. Step 132 solves for the third set of parameters using the likelihood function and the observable data. Step 134 provides a promotional model as a product combination of the expected value of customer traffic and the expected value of selecting a product and the expected value of quantity of selected product. The promotional model is used to generate report 16 for retailer 10.

The analysis of report 16, as generated by model 14, helps explain the effect of promotional programs on unit sales, revenue, and profitability. Retailer 10 can use promotional model 14 to forecast unit sales per product over time, under a variety of promotional programs, and combinations of promotional programs. Understanding the cause and effect behind promotional offerings is important to increasing the profitability of the retail stores. The promotional model addresses effective analysis techniques for various promotions, in terms of forecasting and backcasting, and provides tools for a successful, scientific approach to promotional programs with a high degree of confidence. Although unit sales in the retail environment has been discussed in detail as the economic model, promotional model 14 is applicable to many other economic, scientific, and commercial decision processes. The model can be used for business planning, assessing a variety of what-if scenarios, business optimization, and evaluation of historical events to compare actuals to forecast and actuals to baseline data.

Figure 10:
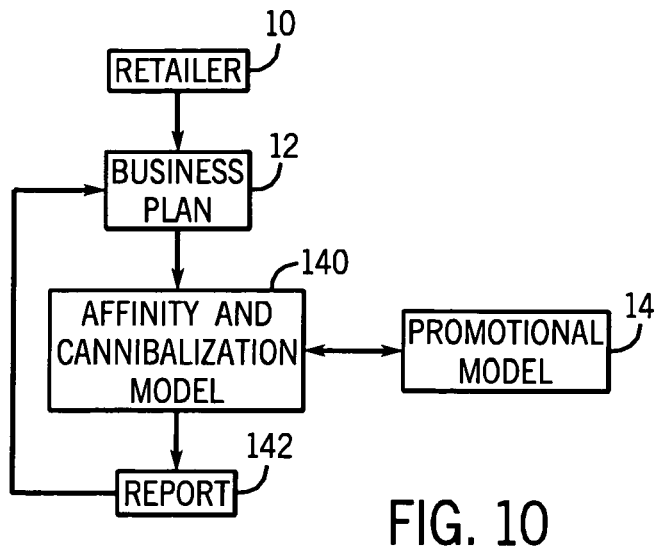
FIG. 10 is a block diagram of retail business process using an affinity and cannibalization model.

Another economic model which is useful in the retail business is described in FIG. 10. Components of FIG. 10 having a similar function are assigned the same reference number used in FIG. 1. Retailer 10 uses business plan 12 to collect and analyze transaction data, evaluate alternatives, run forecasts, and make operational decisions. From business plan 12, retailer 10 provides certain observable data and assumptions, and receives back specific forecasts and predictions from affinity and cannibalization model 140. The model performs a series of complex calculations and mathematical operations to predict and forecast the effect on product $P_i$ attributed to product $P_j$ which is on promotion. Product $P_i$ may or may not be on promotion. The affinity and cannibalization model 140 may also interact with promotional model 14 to exchange, format, and evaluation data. The output of affinity and cannibalization model 140 is a report, chart, table, or other analysis 142, which represents the model's forecasts and predictions based on the given set of data and assumptions. Report 142 is made available to business plan 12 so that retailer 10 can make promotional and operational decisions.

The method presented herein attempts to accurately predict the fiscal impact of affinity and cannibalization (AC) with a practical and scalable solution applicable to the complexities and data volumes found in the retail industry. The features of a practical system for estimating the fiscal impact of AC are: (1) model for cause and effect of changes in sales of individual products, (2) model relating correlated changes in sales of pairs or groups of products, (3) observable data including transaction line-item detail to calibrate models, and (4) flexible processing system to process data, generate, and evaluate the models.

In the overall process, a first function picks up the TLOG data and inputs it into a segmentation function described above. The segmentation function essentially filters the data according to logical rules. After segmentation, the data may be aggregated to any logical groupings in the primary dimensions: store, product, time, customer, and promotion. Finally, a process extracts the relevant co-occurrence data within the segment and logical groupings discussed above. Co-occurrence data describes the number and frequency of transaction events containing both products and each product individually. The data is input into the modeling process, which both characterizes the discovered relationships and also calibrates the model. The modeling process may be run multiple times for various market segments and aggregation levels. The output of each run is a set of parameter values which characterizes AC relationships, and is input to a forecasting process which generates estimates (forecasts and/or backcasts) of the fiscal impact of the AC effect.

Two differences between the present method and the other methods discussed in the background is the ability to generate estimates of fiscal impact, and also to characterize and estimate cannibalization relationships. In addition, the method captures the drivers of cause and effect at both the product level and the relationship level. These drivers include but are not limited to seasonality, price, promotion, product availability (inventory, product introduction/discontinuation), product visibility (merchandizing), and competitor strategy (price image). These drivers may be captured through the modeling process, which can be based on powerful Maximum Likelihood methods for nonlinear parameter estimation, and provides a rigorous framework for estimating the impact of 2-body product interactions. The framework supports the incorporation of non-observable data such as prior information of parameter probability distributions. Finally, the method is flexible enough to accept as input and leverage any methods for market segmentation of data and aggregation for strategic reporting, evaluation, and decision support.

It is possible for sales of product $P_j$ to induce sales of another product $P_i$, or for sales of product $P_j$ to hinder sales of another product $P_i$. Product $P_j$ is considered the driver product and product $P_i$ is the product being driven. When a sale of product $P_j$ causes or induces customer 24 to also buy product $P_i$, the relationship is referred to as affinity. When a sale of product $P_j$ impedes or causes customer 24 to forgo purchase of product $P_i$, the relationship is referred to as cannibalization. Accordingly, the affinity or cannibalization relationship is a linkage between products $P_i$ and $P_j$. In general, the relationship between product $P_i$ and $P_j$ will be either affinity or cannibalization, or there may be no linkage. The processes of affinity and cannibalization are important to understand when modeling unit sales of products, and for understanding the impact which a promotion assigned to one product may have on unit sales of another product.

Consider the example of the cordless drill. Customer 24 may make the decision to purchase the cordless drill to use in various home projects, or as part of his or her business. Cordless drills are adapted to receive drill bits, screwdriver heads, and other attachments. Cordless drills have the advantage and convenience of drawing power from a battery source, which means there is no electrical cord to plug into an electrical outlet. The purpose of the cordless drill is to drill holes and, with the proper attachments, to screw fasteners into building materials. When customer 24 makes the decision to purchase the cordless drill, he or she will consider the variety of options also available for purchase. Customer 24 may need drill bits, screwdriver head, screwdriver bits, socket set, screws, and extra batteries. Cordless drill can also operate attachments such as alignment tool, grinder, wire brush, and buffer, which customer 24 may decide to buy. Retailer 10 may also offer a tool chest to contain all the components, home improvement classes, and extended warranty service programs. Once customer 24 decides to buy the cordless drill, then the stage is set for projects which make use of the tool, e.g. building shelves, installing ceiling fans, finishing a patio, replacing door hinges, just to name a few. Accordingly, the purchase of the cordless drill creates an affinity for other products/services.

On the other hand, the cordless drill also has the opposite effect on other purchases. If customer 24 decides to purchase the cordless drill, he or she will likely forgo purchase of a drill having an electrical cord. Moreover, customer 24 may decide to not purchase a hand-held screwdriver since the cordless drill will likely do the same job in less time and with greater ease. The purchase of the cordless drill may create a cannibalization effect for other products/services.

The effects of affinity and cannibalization are even greater when product $P_j$ is placed on promotion. A promotion of product $P_j$ usually increases its unit sales. When product $P_j$ is placed on promotion and experiences an increase in unit sales as projected, then the lift in sales of product $P_j$ due the promotion causes a corresponding increase in sales of product $P_i$ by the affinity linkage. The product $P_i$ having the affinity relationship with product $P_j$ should be modeled to understand the relationship and its effect on store operations. Retailer 10 should factor the increase in sales of product $P_i$, caused by the promotion of product $P_j$, into business plan 12 to plan promotions, accurately forecast revenue, and ensure that sufficient product $P_i$ is on-hand to meet customer demand.

Likewise, when product $P_j$ is placed on promotion and experiences an increase in unit sales as projected, then the increase in sales of product $P_j$ from the promotion may also cause a corresponding decrease in sales of product $P_i$ by any cannibalization linkage. The product $P_i$ having the cannibalization relationship with product $P_j$ should be modeled to understand the relationship and its effect on store operations. Retailer 10 should factor the decrease in sales of product $P_i$, caused by the promotion of product $P_j$, into business plan 12 to plan promotions, accurately forecast revenue, and ensure that product $P_i$ does not end up over-stocked. Thus, the promotion of product $P_j$ has multi-faceted impact on products $P_i$ and $P_j$.

From the discussion of the share model, $b_i(t)$ is the number of transactions (baskets of merchandise) containing at least one product $P_i$ per store, per time period. The basket share model $b_j(t)$ is the number of transactions containing at least one product $P_j$ per store, per time period. The affinity and cannibalization model uses co-occurrence of products $P_i$ and $P_j$ in the same basket, as observed from the TLOG data, to estimate relationship between the pair of products. If products $P_i$ and $P_j$ are uncorrelated, then they may be found together in the same transaction with a certain base probability. If the observed occurrence of products $P_i$ and $P_j$ being found together in the same transaction is greater than the uncorrelated base probability by statistically significant amount, then an affinity relationship exists between the products. The purchase of product $P_j$ influences the buying decision for customer 24 to also purchase product $P_i$. If the observed occurrence of products $P_i$ and $P_j$ being found together in the same transaction is less than the uncorrelated base probability by statistically significant amount, then a cannibalization relationship exists between the products. The purchase of product $P_j$ influences the buying decision for customer 24 to forgo purchase of product $P_i$.

An observed increased (decreased) probability of co-occurrence is not sufficient to quantify the affinity (cannibalization) relationship between the products. Typically the relationship will not be symmetric and one product will be the dominant, or driver, product.

The relationship between changes of basket share models $b_i(t)$ and $b_j(t)$ is shown in equation (32). We define the change in the basket share models, $\Delta b_i(t)$ and $\Delta b_j(t)$, of products $P_i$ and $P_j$ due to a change in the price or promotion state of the driver product $P_j$ as the model share values before the change minus the model share values after the change. The change in basket share models $\Delta b_i(t)$ and $\Delta b_j(t)$ are functions of products $P_i$ and $P_j$.

$$\Delta(b_i(t)) = \alpha_{ij}\Delta(b_j(t)) \tag{32}$$

The linear relationship in equation (32) shows that the change in baskets of $b_i(t)$ is proportional to change in baskets of $b_j(t)$ by the constant of proportionality ($\alpha_{ij}$) between products $P_i$ and $P_j$. In other words, the linear relationship between $b_i(t)$ and $b_j(t)$ relates baskets of the first product to baskets of the second product by the constant of proportionality. Consider the example where transaction counts of product $P_j$ increases by 10 per store per day due to a promotional lift. If the constant of proportionality $\alpha_{ij}$ between products $P_i$ and $P_j$ is 0.1, then retailer 10 can expect to have 1 more transaction containing product $P_i$ per store per day, due to the promotion of product $P_j$.

The linear relationship between changes in basket share models can be defined in terms of the following conditional probability $\Gamma(P_i|P_j)$, see equations (33)-(34).

$$b_i = \Gamma(P_i|P_j)b_j + \Gamma(P_i|\overline{P_j})\overline{b_j} \tag{33}$$

$$b_i = \Gamma(P_i|P_j)b_j + \Gamma(P_i|\overline{P_j})(1-b_j) \tag{34}$$

The conditional probability $\Gamma(P_i|P_j)$ is total baskets containing products $P_i$ and $P_j$ over total baskets containing product $P_j$. It is interpreted as the probability of purchasing $P_i$ given that $P_j$ is already selected for purchase. The conditional probability $\Gamma(P_i|\overline{P_j})$ is total baskets containing product $P_i$ and no product $P_j$ over total baskets containing no product $P_j$. The basket share model $\overline{b_j}$ is the number of transactions (baskets of merchandise) containing no product $P_j$ per store, per time period.

As an approximation toward the solution of constant of proportionality $\alpha_{ij}$, assume that the conditional probabilities $\Gamma(P_i|P_j)$ and $\Gamma(P_i|\overline{P_j})$ are independent of basket share model $b_j$. Equation (32) is then derived from a Taylor series expansion:

$$f(x) = f(x_0) + f'(x_0)(x-x_0) + \frac{f''(x)(x-x_0)^2}{2!} + \ldots + \frac{f^{(n)}(x)(x-x_0)^n}{n!} + O(x-x_0)^{n+1} \tag{35}$$

of the functional dependence of $b_i$ on $b_j$. The Taylor series is evaluated at the non-promotional state of $b_i$. Each term in the expansion represents a deviation from this baseline state. The early term(s) in the Taylor series can be used to estimate and define the constant of proportionality. For example, the first derivative term of the Taylor series represents the slope of the function at $x_0$. The first derivative can be used to estimate $\alpha_{ij}$, as shown in equations (36)-(38). Higher order terms can be used as well.

$$\alpha_{ij} = \frac{\partial b_i}{\partial b_j} \tag{36}$$

$$\alpha_{ij} = \frac{\partial(\Gamma(P_i|P_j)b_j + \Gamma(P_i|\overline{P_j})(1-b_j))}{\partial b_j} \tag{37}$$

$$\alpha_{ij} = \Gamma(P_i|P_j) - \Gamma(P_i|\overline{P_j}) \tag{38}$$

The constant of proportionality $\alpha_{ij}$ can now be determined from the TLOG data. Consider the following set of TLOG data in Table 2:

TABLE 2

TLOG Data

| Store | Product | Time | Trans | Qty | Price | Profit | Promotion | Customer |
|---|---|---|---|---|---|---|---|---|
| S1 | P1 | D1 | T1 | 1 | 1.50 | 0.20 | PROMO1 | C1 |
| S1 | P1 | D1 | T2 | 1 | 1.50 | 0.20 | PROMO1 | C2 |
| S1 | P2 | D1 | T2 | 1 | 3.00 | 0.40 | 0 | C2 |
| S1 | P2 | D1 | T3 | 1 | 3.00 | 0.40 | 0 | C3 |
| S1 | P3 | D1 | T4 | 1 | 2.25 | 0.60 | 0 | C4 |
| S1 | P4 | D1 | T5 | 1 | 2.65 | 0.55 | 0 | C5 |
| S1 | P5 | D1 | T6 | 1 | 1.55 | 0.20 | 0 | C6 |
| S1 | P6 | D1 | T7 | 1 | 5.00 | 1.10 | 0 | C7 |
| S1 | P7 | D1 | T8 | 1 | 1.90 | 0.50 | 0 | C8 |
| S1 | P8 | D1 | T9 | 1 | 3.30 | 0.65 | 0 | C9 |
| S1 | P9 | D1 | T10 | 1 | 2.30 | 0.55 | 0 | C10 |

The simplified example of TLOG data is shown in Table 2 for the purpose of illustrating the solution of the constant of proportionality $\alpha_{ij}$ in affinity and cannibalization model 140. The first line item shows that on day/time D1 (date and time) store S1 had transaction T1 in which customer C1 purchased one product P1 at 1.50. In transaction T2 on day/time D1, customer C2 has one product P1 at price 1.50 each and one product P2 at price 3.00. In transaction T3, customer C3 has one product P2 at 3.00. The remaining transactions T4-T10 on day/time D1 in store S1 involved other products P3-P9 as shown.

The TLOG data in Table 2 further shows that products P1 in transactions T1 and T2 had promotion PROMO1. Again, to simplify the explanation, no other product in Table 2 has any promotion.

The probability of having products P1 and P2 in the same transaction, assuming that the products are uncorrelated, is the number of transactions containing product P1 over the total number of transactions times the number of transactions containing product P2 over the total number of transactions. The uncorrelated base probability is (2/10)*(2/10)=0.04. The actual probability of observing the products together is the number of transactions containing both products divided by the total number of transactions is (1/10)=0.1>0.04. Accordingly, the presumption is that these products are positively correlated, i.e., that there is an affinity relationship between them.

The conditional probability $\Gamma(P2|P1)$ is the number of basket with products P1 and P2 over total number of baskets divided by the number of basket with product P1 over total number of baskets. From the TLOG data in Table 2, $\Gamma(P1|P2) = (1/10)/(2/10) = 0.5$. $\Gamma(P2|\overline{P1})$ is total baskets containing product P2 and no product P1 over total baskets divided by total baskets containing no product P1 over total number of baskets. From the TLOG data in Table 2, $\Gamma(P2|\overline{P1}) = (1/10)/(8/10) = 0.125$. From equation (37), $\alpha_{P2P1}$ is $\Gamma(P2|P1)-\Gamma(P2|\overline{P1})=0.5-0.125=0.375$. Since $\alpha_{P2P1}$ is greater than zero, the constant of proportionality $\alpha_{P2P1}$ defines an affinity relationship between products P1 and P2. If $\alpha_{ij}$ had been less than zero, then the products would have a cannibalization relationship. An offset threshold $\tau$ may be assigned to the constant of proportionality such that an affinity relationship exists if $\alpha_{ij}$ is greater than $\tau$, and a cannibalization relationship exists if $\alpha_{ij}$ is less than $-\tau$. In practice, the offsets for affinity and cannibalization may be asymmetric.

Returning to equation (32), the $\Delta b_{P1}(D1)$ in equation (32) is the change in $b_{P1}(D1)$, usually an increase in basket share, associated with promotion PROMO1 of product P1 over time period D1, i.e. promotional lift. With the constant of proportionality $\alpha_{P2P1}$ known from the TLOG data, the expectation of $\Delta b_{P2}(D1)$ can be determined. If $\Delta b_{P1}(D1)$ changes by 10 due to promotion PROMO1, then $\Delta b_{P2}(D1)$ changes by 10*0.375=3.75 due to the promotion PROMO1 on product P1.

Figure 11:
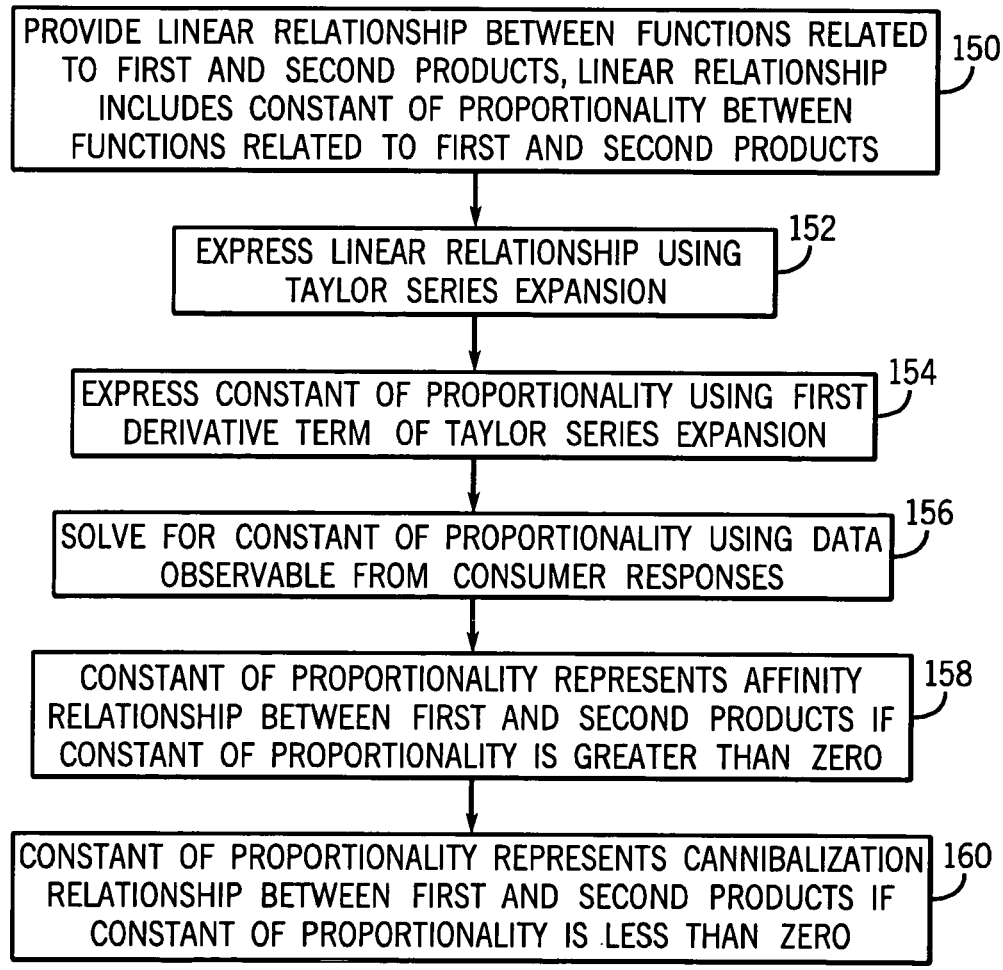
FIG. 11 illustrates the steps of providing affinity and cannibalization features for use with the promotional model.

The process of forecasting an affinity and cannibalization model using observable data from customer purchase decisions is shown in FIG. 11. Step 150 provides a linear relationship between functions related to first and second products. The linear relationship includes a constant of proportionality between the functions related to the first and second products. The linear relationship between the functions related to the first and second products relates basket share of the first product to basket share of the second product by the constant of proportionality, i.e. the linear relationship is given by $\Delta b_i(t)=\alpha_{ij}\Delta b_j(t)$, where $\alpha_{ij}$ is the constant of proportionality. Step 152 expresses the linear relationship using a Taylor Series expansion. Step 154 expresses the constant of proportionality using a first derivative term of the Taylor Series expansion. Step 156 solves for the constant of proportionality using data observable from customer transactions. The data observable from customer transactions includes transaction, product, and promotion. In step 158, the constant of proportionality represents an affinity relationship between the first and second products if the constant of proportionality is greater than zero. In step 160, the constant of proportionality represents a cannibalization relationship between the first and second products if the constant of proportionality is less than zero.

The analysis of report 142, as generated by affinity and cannibalization model 140, helps explain the effect of affinity and cannibalization on customer response in terms of unit sales, revenue, and profitability. Retailer 10 can use model 140 to forecast unit sales per product over time, under a variety of promotional programs, and combinations of promotional programs. More specifically, retailer 10 can understand the effect on unit sales of one product as influenced by a promotional offering on another product, where there is an affinity or cannibalization relationship between the two products. Understanding the cause and effect behind promotional offerings and inter-product relationships is important to increasing the profitability of the retail stores. The promotional model addresses effective analysis techniques for various promotions, in terms of forecasting and backcasting, and provides tools for a successful, scientific approach to promotional programs with a high degree of confidence. Although unit sales in the retail environment has been discussed in detail as the economic model, affinity and cannibalization model 140 is applicable to many other economic, scientific, and commercial decision processes.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of modeling customer response to promotional programs for controlling a retail commerce system, comprising:

moving goods between members of a retail commerce system;

recording transactional data from customer sales involving the movement of goods between the members of the retail commerce system, the transactional data including store number, product number, time of transaction, quantity, price, and promotion identifier;

transmitting the transactional data through an open-architecture computer network and storing the transactional data on a mass storage device;

retrieving the transactional data from the mass storage device;

providing a first expression of an expected value of customer traffic within a store as a component of the retail commerce system, the first expression being defined as an exponential function of $Q_0+\alpha t+f_T(t)$, where $Q_0$ is a base transaction rate for the store, $\alpha t$ is a product of growth rate and time, and $f_T(t)$ is a product of a time dependent indicator and traffic coefficient;

providing a second expression of an expected value of selecting a product, the second expression being defined as $\exp\{V(t)-\beta[(P-P_0)/P_0]+f_S(t)\}/(1+\exp\{V(t)-\beta[(P-P_0)/P_0]+f_S(t)\})$, where $\exp\{\}$ is an exponential function, $V(t)$ is a time dependent base rate of sales for product P, $\beta$ is a price response for product P, $P_0$ is a reference price for product P, and $f_S(t)$ is a product of a time dependent indicator for regular price and share coefficient for product P;

providing a third expression of an expected value of quantity of selected product as an average of count of product P in transactions containing at least one product P;

solving, by a computer processor, for the expected value of customer traffic, expected value of selecting the product, and expected value of quantity of selected product using the transactional data from customer sales;

providing a customer response model as a multiplicative combination of the expected value of customer traffic and the expected value of selecting a product and the expected value of quantity of selected product, the customer response model generating a forecast of demand for the goods based on a promotional program; and reporting the forecast of demand for the goods to a member of the commerce system to control the movement of goods in the retail commerce system.

2. The computer implemented method of claim 1, further including providing a likelihood function for the customer traffic.

3. The computer implemented method of claim 2, wherein the likelihood function uses a Poisson probability distribution.

4. A method of modeling customer response to promotional programs based on customer buying decisions for controlling a retail commerce system, comprising:

moving goods between members of a retail commerce system;

recording transactional data from customer sales involving the movement of goods between the members of the retail commerce system;

providing expected values for a set of factors representing components of the customer buying decision, the set of factors including, (a) a first expression of an expected value of customer traffic within a store as a component of the retail commerce system, the first expression being defined as an exponential function of $Q_0+\alpha t+f_T(t)$, where $Q_0$ is a base transaction rate for the store, $\alpha t$ is a product of growth rate and time, and $f_T(t)$ is a product of a time dependent indicator and traffic coefficient, (b) a second expression of an expected value of selecting a product, the second expression being defined as $\exp\{V(t)-\beta[(P-P_0)/P_0]+f_S(t)\}/(1+\exp\{V(t)-\beta[(P-P_0)/P_0]+f_S(t)\})$, where $\exp\{\ \}$ is an exponential function, $V(t)$ is a time dependent base rate of sales for product P, $\beta$ is a price response for product P, $P_0$ is a reference price for product P, and $f_S(t)$ is a product of a time dependent indicator for regular price and share coefficient for product, and (c) a third expression of an expected value of quantity of selected product as an average of count of product P in transactions containing at least one product P;

solving, by a computer processor, for the expected value of customer traffic, expected value of selecting the product, and expected value of quantity of selected product using the transactional data from customer sales;

providing a customer response model as a combination of the expected value of customer traffic and the expected value of selecting a product and the expected value of quantity of selected product, the customer response model generating a forecast of demand for the goods based on a promotional program; and reporting the forecast of demand for the goods to a member of the commerce system to control the movement of goods in the retail commerce system.

5. The method of claim 4, wherein the transactional data includes transaction, product, and promotion.

6. The method of claim 4, further including providing a likelihood function for each of the set of factors.

7. The method of claim 6, wherein at least one likelihood function is selected from the group of Poisson and Binomial probability functions.

8. A method of modeling customer response to promotional programs for controlling a retail commerce system, comprising:

moving goods between members of a retail commerce system;

recording transactional data involving the movement of goods between the members of the retail commerce system;

providing a first expression of an expected value of customer traffic within a store as a component of the retail commerce system, wherein the first expression is defined as an exponential function of $Q_0+\alpha t+f_T(t)$, where $Q_0$ is a base transaction rate for the store, $\alpha t$ is a product of growth rate and time, and $f_T(t)$ is a product of a time dependent indicator and traffic coefficient;

providing a second expression of an expected value of selecting a product;

providing a third expression of an expected value of quantity of selected product as an average of count of product P taken only from transactions containing at least one product P;

solving, by a computer processor, for the expected value of customer traffic, expected value of selecting the product, and expected value of quantity of selected product using the transactional data from customer sales;

providing a customer response model as a multiplicative combination of the expected value of customer traffic and the expected value of selecting a product and the expected value of quantity of selected product, the customer response model generating a forecast of demand for the goods based on a promotional program; and reporting the forecast of demand for the goods to a member of the commerce system to control the movement of goods in the retail commerce system.

9. The method of claim 8, further including providing a likelihood function for the customer traffic.

10. The method of claim 9, wherein the likelihood function uses a Poisson probability distribution or Binomial probability function.

11. The method of claim 8, further including utilizing an iterative process to solve for the expected value of customer traffic, expected value of selecting the product, and expected value of quantity of selected product.

12. The method of claim 8, further including segmenting the transactional data prior to solving for the expected value of customer traffic, expected value of selecting the product, and expected value of quantity of selected product.

13. The method of claim 8, further including aggregating the segmented transactional data.

14. A method of modeling customer response to promotional programs for controlling a retail commerce system, comprising:

moving goods between members of a retail commerce system;

recording transactional data involving the movement of goods between the members of the retail commerce system;

providing a first expression of an expected value of customer traffic within a store as a component of the retail commerce system;

providing a second expression of an expected value of selecting a product, wherein the second expression is defined as $\exp\{V(t)-\beta[(P-P_0)/P_0]+f_S(t)\}/(1+\exp\{V(t)-\beta[(P-P_0)/P_0]+f_S(t)\})$, where $\exp\{\ \}$ is an exponential function, $V(t)$ is a time dependent base rate of sales for product P, $\beta$ is a price response for product P, $P_0$ is a reference price for product P, and $f_S(t)$ is a product of a time dependent indicator for regular price and share coefficient for product P;

providing a third expression of an expected value of quantity of selected product as an average of count of product P taken only from transactions containing at least one product P;

solving, by a computer processor, for the expected value of customer traffic, expected value of selecting the product, and expected value of quantity of selected product using the transactional data from customer sales;

providing a customer response model as a multiplicative combination of the expected value of customer traffic and the expected value of selecting a product and the expected value of quantity of selected product, the customer response model generating a forecast of demand for the goods based on a promotional program; and reporting the forecast of demand for the goods to a member of the commerce system to control the movement of goods in the retail commerce system.

* * * * *